(12) United States Patent
Buehne et al.

(10) Patent No.: US 9,805,070 B2
(45) Date of Patent: Oct. 31, 2017

(54) DYNAMIC MIGRATION SCRIPT MANAGEMENT

(71) Applicant: ORACLE INTERNATIONAL CORPORATION, Redwood Shores, CA (US)

(72) Inventors: Stephan Buehne, Treibweg (DE); Elmar Spiegelberg, Am Kleefeldchen (DE)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 500 days.

(21) Appl. No.: 13/937,486

(22) Filed: Jul. 9, 2013

(65) Prior Publication Data
US 2015/0019478 A1   Jan. 15, 2015

(51) Int. Cl.
*G06F 7/00* (2006.01)
*G06F 17/30* (2006.01)
*G06F 17/00* (2006.01)

(52) U.S. Cl.
CPC ...... *G06F 17/303* (2013.01); *G06F 17/30079* (2013.01)

(58) Field of Classification Search
CPC .......................... G06F 17/30079; G06F 17/303
See application file for complete search history.

(56) References Cited

U.S. PATENT DOCUMENTS

| 6,016,394 | A | 1/2000 | Walker |
| 6,185,625 | B1* | 2/2001 | Tso ................ G06F 17/30905 707/E17.121 |
| 6,477,483 | B1 | 11/2002 | Scarlat et al. |
| 6,738,811 | B1 | 5/2004 | Liang |

(Continued)

FOREIGN PATENT DOCUMENTS

| CN | 1652087 A | 8/2005 |
| CN | 102656565 | 9/2012 |

(Continued)

OTHER PUBLICATIONS

Baysal, et al., "A Bug You Like: A Framework for Automated Assignment of Bugs", 2009.

(Continued)

*Primary Examiner* — Kannan Shanmugasundaram
(74) *Attorney, Agent, or Firm* — Kilpatrick Townsend & Stockton LLP

(57) ABSTRACT

Various embodiments for managing migration between server systems are presented. Indications of a plurality of migration scripts to be executed during a migration of a database system from a source server system to a target server system may be received. An execution order for the plurality of migration scripts may be determined based upon characteristics of a plurality of database objects to be migrated using the plurality of migration scripts and characteristics of the plurality of migration scripts. Execution of a first migration script of the plurality of migration scripts may be initiated according to the determined execution (Continued)

order. The first migration script may cause copying of a database object of the plurality of database objects from the source server system to the target server system.

20 Claims, 7 Drawing Sheets

(56) References Cited

U.S. PATENT DOCUMENTS

| | | | |
|---|---|---|---|
| 6,973,489 B1 | 12/2005 | Levy | |
| 7,177,866 B2 | 2/2007 | Holenstein et al. | |
| 7,290,003 B1 | 10/2007 | Tong | |
| 7,548,898 B1 | 6/2009 | Tarenskeen et al. | |
| 7,580,862 B1 | 8/2009 | Montelo et al. | |
| 7,693,983 B1 | 4/2010 | Gupta et al. | |
| 8,150,811 B1 | 4/2012 | Tarenskeen et al. | |
| 8,271,757 B1* | 9/2012 | Chatterjee | G06F 3/0605 |
| | | | 711/114 |
| 8,606,894 B1 | 12/2013 | Fremont et al. | |
| 8,639,989 B1 | 1/2014 | Sorenson, III et al. | |
| 8,924,353 B1 | 12/2014 | Patwardhan et al. | |
| 8,943,032 B1* | 1/2015 | Xu | G06F 7/00 |
| | | | 707/661 |
| 9,098,364 B2 | 8/2015 | Davis | |
| 9,401,904 B1 | 7/2016 | Hankins et al. | |
| 9,442,983 B2 | 9/2016 | Higginson et al. | |
| 9,491,072 B2 | 11/2016 | Raghunathan et al. | |
| 2001/0029502 A1 | 10/2001 | Oeda | |
| 2002/0002578 A1* | 1/2002 | Yamashita | G06F 9/4862 |
| | | | 718/105 |
| 2002/0019826 A1 | 2/2002 | Tan | |
| 2002/0147645 A1 | 10/2002 | Alao et al. | |
| 2002/0177977 A1 | 11/2002 | Scarlat et al. | |
| 2002/0194329 A1 | 12/2002 | Alling | |
| 2002/0198984 A1 | 12/2002 | Goldstein et al. | |
| 2003/0066049 A1 | 4/2003 | Atwood et al. | |
| 2003/0069903 A1 | 4/2003 | Gupta et al. | |
| 2003/0192028 A1 | 10/2003 | Gusler et al. | |
| 2004/0098425 A1 | 5/2004 | Wiss et al. | |
| 2004/0167840 A1* | 8/2004 | Tully | G06Q 40/00 |
| | | | 705/35 |
| 2004/0178261 A1 | 9/2004 | Potonniee et al. | |
| 2004/0181790 A1 | 9/2004 | Herrick | |
| 2004/0260875 A1 | 12/2004 | Murotani et al. | |
| 2005/0021567 A1 | 1/2005 | Holenstein et al. | |
| 2005/0055446 A1 | 3/2005 | Chidambaran et al. | |
| 2005/0102318 A1 | 5/2005 | Odhner et al. | |
| 2005/0204241 A1 | 9/2005 | Tamakoshi | |
| 2006/0059253 A1 | 3/2006 | Goodman et al. | |
| 2006/0112247 A1 | 5/2006 | Ramany et al. | |
| 2006/0156086 A1 | 7/2006 | Flynn et al. | |
| 2006/0173875 A1 | 8/2006 | Stefaniak et al. | |
| 2006/0179171 A1 | 8/2006 | Stefaniak et al. | |
| 2006/0179431 A1 | 8/2006 | Devanathan et al. | |
| 2006/0235899 A1 | 10/2006 | Tucker | |
| 2006/0282825 A1 | 12/2006 | Taylor | |
| 2007/0028234 A1 | 2/2007 | Sero et al. | |
| 2007/0150488 A1 | 6/2007 | Barsness et al. | |
| 2007/0239774 A1 | 10/2007 | Bodily et al. | |
| 2007/0299892 A1 | 12/2007 | Nakahara | |
| 2008/0247320 A1 | 10/2008 | Grah et al. | |
| 2008/0313595 A1 | 12/2008 | Boulineau et al. | |
| 2009/0070733 A1 | 3/2009 | Huang et al. | |
| 2009/0113399 A1 | 4/2009 | Tzoref et al. | |
| 2009/0126022 A1 | 5/2009 | Sakaki | |
| 2009/0187413 A1 | 7/2009 | Abels et al. | |
| 2009/0210857 A1 | 8/2009 | Martineau | |
| 2009/0238078 A1 | 9/2009 | Robinson et al. | |
| 2009/0313311 A1 | 12/2009 | Hoffmann et al. | |
| 2010/0005097 A1 | 1/2010 | Liang et al. | |
| 2010/0191884 A1 | 7/2010 | Holenstein et al. | |
| 2010/0192156 A1 | 7/2010 | Hollingsworth | |
| 2010/0198799 A1 | 8/2010 | Krishnan et al. | |
| 2010/0262974 A1 | 10/2010 | Uyeda | |
| 2011/0093436 A1 | 4/2011 | Zha et al. | |
| 2011/0107327 A1 | 5/2011 | Barkie et al. | |
| 2011/0161933 A1 | 6/2011 | Hudson | |
| 2012/0017112 A1 | 1/2012 | Broda et al. | |
| 2012/0041933 A1 | 2/2012 | Driesen | |
| 2012/0150642 A1 | 6/2012 | Kandanala et al. | |
| 2012/0221845 A1 | 8/2012 | Ferris | |
| 2012/0254435 A1 | 10/2012 | Zhaofu et al. | |
| 2012/0265726 A1* | 10/2012 | Padmanabhan | G06F 17/303 |
| | | | 707/602 |
| 2012/0284360 A1* | 11/2012 | Bense | G06F 9/4843 |
| | | | 709/217 |
| 2012/0297016 A1 | 11/2012 | Iyer et al. | |
| 2012/0303739 A1 | 11/2012 | Ferris | |
| 2012/0311128 A1 | 12/2012 | Pechanec et al. | |
| 2013/0067298 A1 | 3/2013 | Li et al. | |
| 2013/0085742 A1 | 4/2013 | Barker et al. | |
| 2013/0085989 A1 | 4/2013 | Nayyar et al. | |
| 2013/0152050 A1 | 6/2013 | Chang et al. | |
| 2013/0173546 A1 | 7/2013 | Cline et al. | |
| 2013/0173547 A1* | 7/2013 | Cline | G06F 17/303 |
| | | | 707/638 |
| 2013/0211559 A1 | 8/2013 | Lawson et al. | |
| 2013/0268643 A1 | 10/2013 | Chang et al. | |
| 2013/0268799 A1 | 10/2013 | Mestery et al. | |
| 2013/0268800 A1 | 10/2013 | Rangaiah | |
| 2013/0283364 A1 | 10/2013 | Chang et al. | |
| 2013/0297802 A1 | 11/2013 | Laribi et al. | |
| 2013/0311968 A1 | 11/2013 | Sharma | |
| 2013/0326028 A1 | 12/2013 | Cox et al. | |
| 2013/0339419 A1 | 12/2013 | Emaru | |
| 2014/0012960 A1 | 1/2014 | Chien | |
| 2014/0019212 A1 | 1/2014 | Lieblich et al. | |
| 2014/0019961 A1 | 1/2014 | Neuse et al. | |
| 2014/0059559 A1 | 2/2014 | Alatorre et al. | |
| 2014/0075033 A1 | 3/2014 | Doering et al. | |
| 2014/0089809 A1 | 3/2014 | Levy et al. | |
| 2014/0109053 A1 | 4/2014 | Vasudevan et al. | |
| 2014/0129690 A1 | 5/2014 | Jaisinghani et al. | |
| 2014/0172782 A1* | 6/2014 | Schuenzel | H04L 67/325 |
| | | | 707/609 |
| 2014/0195636 A1 | 7/2014 | Karve et al. | |
| 2014/0279890 A1 | 9/2014 | Srinivasan et al. | |
| 2014/0337429 A1 | 11/2014 | Asenjo et al. | |
| 2014/0344439 A1 | 11/2014 | Kempf et al. | |
| 2014/0373011 A1 | 12/2014 | Anderson et al. | |
| 2015/0019195 A1 | 1/2015 | Davis | |
| 2015/0019197 A1 | 1/2015 | Higginson et al. | |
| 2015/0019479 A1 | 1/2015 | Buehne et al. | |
| 2015/0019487 A1 | 1/2015 | Buehne et al. | |
| 2015/0019488 A1 | 1/2015 | Higginson et al. | |
| 2015/0019564 A1 | 1/2015 | Higginson et al. | |
| 2015/0019700 A1 | 1/2015 | Masterson et al. | |
| 2015/0019706 A1 | 1/2015 | Raghunathan et al. | |
| 2015/0019707 A1 | 1/2015 | Raghunathan et al. | |
| 2015/0020059 A1 | 1/2015 | Davis | |
| 2016/0364229 A1 | 12/2016 | Higginson et al. | |
| 2017/0118244 A1 | 4/2017 | Bai et al. | |

FOREIGN PATENT DOCUMENTS

| | | |
|---|---|---|
| CN | 105308577 A | 2/2016 |
| CN | 105324756 A | 2/2016 |
| CN | 105324769 A | 2/2016 |
| CN | 105359102 A | 2/2016 |
| CN | 105359146 A | 2/2016 |
| CN | 105359147 A | 2/2016 |
| CN | 105393250 A | 3/2016 |
| CN | 105556515 | 5/2016 |
| CN | 105580032 | 5/2016 |
| EP | 2416591 | 2/2012 |
| EP | 3019958 | 5/2016 |
| EP | 3019961 | 5/2016 |
| EP | 3019962 | 5/2016 |
| EP | 3019975 | 5/2016 |
| EP | 3019976 | 5/2016 |
| EP | 3019979 | 5/2016 |
| EP | 3019980 | 5/2016 |

(56) References Cited

FOREIGN PATENT DOCUMENTS

| EP | 3019981 | 5/2016 |
|---|---|---|
| EP | 3020010 | 5/2016 |
| GB | 2488742 | 9/2010 |
| JP | 2006277153 | 10/2006 |
| WO | 9962047 | 10/1999 |
| WO | 0153949 | 7/2001 |
| WO | 2015/005991 | 1/2015 |
| WO | 2015/005994 | 1/2015 |
| WO | 2015/006124 | 1/2015 |
| WO | 2015/006129 | 1/2015 |
| WO | 2015/006132 | 1/2015 |
| WO | 2015/006137 | 1/2015 |
| WO | 2015/006138 | 1/2015 |
| WO | 2015/006308 | 1/2015 |
| WO | 2015/006358 | 1/2015 |
| WO | 2015191119 | 12/2015 |

OTHER PUBLICATIONS

U.S. Appl. No. 13/937,868, Final Office Action dated Apr. 22, 2016, all pages.
U.S. Appl. No. 13/937,483, Final Office Action dated Feb. 26, 2016, all pages.
U.S. Appl. No. 13/937,344, Notice of Allowance dated May 4, 2016, 11 pages.
U.S. Appl. No. 13/937,344, Notice of Allowance dated Jun. 6, 2016, 5 pages.
U.S. Appl. No. 13/937,483, Advisory Action dated May 12, 2016, 3 pages.
U.S. Appl. No. 13/937,545, Final Office Action dated May 13, 2016, 20 pages.
U.S. Appl. No. 13/937,970, Non-Final Office Action dated May 12, 2016, 28 pages.
U.S. Appl. No. 13/937,977, Notice of Allowance dated Mar. 16, 2016, 18 pages.
To et al., Best Practices for Database Consolidation on Exadata Database Machine, Oracle, Oracle White Paper, 2011, 35 pages.
Vengurlekar et al., Best Practices for Database Consolidation in Private Clouds, Oracle, Oracle White Paper, Mar. 2012, 29 pages.
U.S. Appl. No. 13/937,344, Corrected Notice of Allowability dated Sep. 15, 2016, 2 pages.
U.S. Appl. No. 13/937,344 , Notice of Allowance, dated Oct. 11, 2016, 2 pages.
U.S. Appl. No. 13/937,483, Non-Final Office Action dated Aug. 12, 2016, 13 pages.
U.S. Appl. No. 13/937,885, Non-Final Office Action dated Aug. 18, 2016, 32 pages.
U.S. Appl. No. 13/937,977, Corrected Notice of Allowability dated Jul. 18, 2016, 2 pages.
U.S. Appl. No. 13/937,988, Non-Final Office Action dated Sep. 1, 2016, 10 pages.
U.S. Appl. No. 13/938,061, Non-Final Office Action dated Aug. 18, 2016, 29 pages.
U.S. Appl. No. 13/937,970, Final Office Action dated Dec. 1, 2016, 22 pages.
U.S. Appl. No. 13/937,483, Notice of Allowance dated Jan. 20, 2017, 8 pages.
European Application No. 14745014.2, Office Action dated Jan. 18, 2017, 8 pages.
Chinese Application No. 201480035255.X, Office Action dated Feb. 27, 2017, 11 pages (5 pages for the original document and 6 pages for the English translation).
U.S. Appl. No. 13/937,545, Non-Final Office Action dated Feb. 7, 2017, 19 pages.
U.S. Appl. No. 13/938,061, Final Office Action dated Mar. 23, 2017, 29 pages.
U.S. Appl. No. 13/937,868, Non-Final Office Action dated Apr. 5, 2017, 23 pages.
U.S. Appl. No. 13/937,970, Advisory Action dated Apr. 13, 2017, 3 pages.
Chinese Application No. 201480035257.9, Office Action dated Apr. 6, 2017, 10 pages (5 pages for the original document and 5 pages for the English translation).
U.S. Appl. No. 13/937,483, Notice of Allowance dated May 3, 2017, 5 pages.
U.S. Appl. No. 13/937,988, Notice of Allowance dated Apr. 27, 2017, 8 pages.
U.S. Appl. No. 13/937,885, Final Office Action dated May 19, 2017, 22 pages.
Chanchary et al., Data Migration: Connecting Databases in the Cloud, ICCIT 2012, Saudi Arabia, retrieved from the Internet: <URL:http://www.chinacloud.cnjupload/2012-03/12033108076850.pdf>, Jun. 28, 2012, pp. 450-455.
Leite et al., Migratool: Towards a Web-Based Spatial Database Migration Tool, IEEE Computer Society, Proceedings of the 16$^{th}$ International Workshop on Database and Expert Systems Applications, Aug. 22, 2005, pp. 480-484.
Tao et al., Intelligent database placement in cloud environment, Web Services (ICWS), 2012 IEEE 19th International Conference, IEEE Computer Society, Jun. 24, 2012, pp. 544-551.
U.S. Appl. No. 13/938,066, Non-Final Office Action dated Dec. 17, 2014.
International Application No. PCT/US2014/045226, International Search Report and Written Opinion dated Oct. 30, 2014, 10 pages.
International Application No. PCT/US2014/045240, International Search Report and Written Opinion dated Oct. 21, 2014, 10 pages.
International Application No. PCT/US2014/045289, International Search Report and Written Opinion dated Oct. 15, 2014, 9 pages.
International Application No. PCT/US2014/045721, International Search Report and Written Opinion dated Nov. 4, 2014, 12 pages.
International Application No. PCT/US2014/045804, International Search Report and Written Opinion dated Nov. 17, 2014, 12 pages.
U.S. Appl. No. 13/937,977, Non-Final Office Action dated Aug. 12, 2014, 28 pages.
Charles, Bug Severity vs. Priority, Quality Intelligence Blog, Retrieved on Aug. 4, 2014, from http://quality-intelligence.blogspot.com/2010/08/bug-severity-vs-priority.html, Aug. 22, 2010, 6 pages.
Das et al., Albatross: Lightweight elasticity in shared storage databases for the cloud using live data migration, 37th International Conference on Very Large Data Bases, Proceedings of the VLDB Endowment, vol. 4, No. 8, Retrieved from the Internet:URL:http://www.cs.ucsb.eduj-sudiptojpapers/albatross.pdf, Aug. 29, 2011, 12 pages.
International Application No. PCT/US2014/040486, International Search Report and Written Opinion dated Sep. 29, 2014, 11 pages.
International Application No. PCT/US2041/040692, International Search Report and Written Opinion dated Oct. 8, 2014, 8 pages.
International Application No. PCT/US2014/045247, International Search Report and Written Opinion dated Sep. 3, 2014, 8 pages.
International Application No. PCT/US2014/045282, International Search Report and Written Opinion dated Sep. 18, 2014, 12 pages.
U.S. Appl. No. 13/937,344, Non-Final Office Action dated Sep. 24, 2015, 11 pages.
U.S. Appl. No. 13/937,483, Non-Final Office Action dated Sep. 25, 2015, 13 pages.
U.S. Appl. No. 13/937,977, Non-Final Office Action dated Aug. 19, 2015, 34 pages.
U.S. Appl. No. 13/938,066, Corrected Notice of Allowability dated Jun. 2, 2015, 2 pages.
International Application No. PCT/US2014/040486, Written Opinion dated Jun. 17, 2015, 7 pages.
International Application No. PCT/US2014/040692, Written Opinion dated Jul. 16, 2015, 7 pages.
U.S. Appl. No. 13/937,970, Non-Final Office Action dated May 5, 2015, 17 pages.
U.S. Appl. No. 13/937,977, Final Office Action dated Feb. 26, 2015, 30 pages.
U.S. Appl. No. 13/938,066, Notice of Allowance dated Apr. 29, 2015, 15 pages.

(56) References Cited

OTHER PUBLICATIONS

U.S. Appl. No. 13/937,868, Non-Final Office Action dated Nov. 4, 2015, 18 pages.
U.S. Appl. No. 13/937,545, Non-Final Office Action dated Nov. 10, 2015, 19 pages.
U.S. Appl. No. 13/937,344, Final Office Action dated Feb. 11, 2016, all pages.
U.S. Appl. No. 13/937,970, Final Office Action dated Dec. 10, 2015, all pages.
International Preliminary Report on Patentability of PCT/US2014/045247, dated Jan. 21, 2016, all pages.
International Preliminary Report on Patentability of PCT/US2014/045804, dated Jan. 21, 2016, all pages.
International Preliminary Report on Patentability of PCT/US2014/045721, dated Jan. 21, 2016, all pages.
International Preliminary Report on Patentability of PCT/US2014/045282, dated Jan. 21, 2016, all pages.
International Preliminary Report on Patentability of PCT/US2014/045289, dated Jan. 21, 2016, all pages.
International Preliminary Report on Patentability of PCT/US2014/045240, dated Jan. 21, 2016, all pages.
Notification of Transmittal of the International Preliminary Report on Patentability of PCT/US2014/040486, dated Oct. 1, 2015, all pages.
Notification of Transmittal of the International Preliminary Report on Patentability of PCT/US2014/040692, dated Oct. 8, 2015, all pages.
International Preliminary Report on Patentability of PCT/US2014/045226, dated Jan. 21, 2016, all pages.
U.S. Appl. No. 13/937,970, Non-Final Office Action dated Jun. 26, 2017, 31 pages.
U.S. Appl. No. 13/938,061, Advisory Action dated Jul. 26, 2017, 6 pages.
Chinese Patent Application No. CN201480035255.X, Notice of Decision to Grant dated Aug. 29, 2017, 4 pages.
International Patent Application No. PCT/US2017/032620, International Search Report and Written Opinion dated Jul. 28, 2017, 13 pages.

\* cited by examiner

DYNAMIC MIGRATION SCRIPT MANAGEMENT

CROSS-REFERENCES TO RELATED APPLICATIONS

The present application is related to the following co-pending and commonly assigned U.S. Patent Applications: U.S. patent application Ser. No. 13/937,977 filed Jul. 9, 2013, now U.S. Pat. No. 9,442,983, issued Sep. 13, 2016, by Higginson and entitled "METHOD AND SYSTEM FOR REDUCING INSTABILITY WHEN UPGRADING SOFTWARE;" U.S. patent application Ser. No. 13/938,061 filed Jul. 9, 2013 by Davis and entitled "CONSOLIDATION PLANNING SERVICE FOR SYSTEMS MIGRATION;" U.S. patent application Ser. No. 13/938,066 filed Jul. 9, 2013, now U.S. Pat. No. 9,098,364, issued Aug. 4, 2015, by Davis and entitled "MIGRATION SERVICES FOR SYSTEMS;" U.S. patent application Ser. No. 13/937,885 filed Jul. 9, 2013 by Higginson and entitled "DATABASE MODELING AND ANALYSIS;" U.S. patent application Ser. No. 13/937,868 filed Jul. 9, 2013 by Higginson and entitled "AUTOMATED DATABASE MIGRATION ARCHITECTURE;" U.S. patent application Ser. No. 13/937,341 filed Jul. 9, 2013, now U.S. Pat. No. 9,491,072, issued Nov. 8, 2016, by Raghunathan et al. and entitled "CLOUD SERVICES LOAD TESTING AND ANALYSIS;" U.S. patent application Ser. No. 13/937,483 filed Jul. 9, 2013 by Raghunathan et al. and entitled "CLOUD SERVICES PERFORMANCE TUNING AND BENCHMARKING;" U.S. patent application Ser. No. 13/937,988 filed Jul. 9, 2013, now U.S. Pat. No. 9,747,311, issued Aug. 29, 2017, by Buehne et al. and entitled "SOLUTION TO GENERATE A SCRIPTSET FOR AN AUTOMATED DATABASE MIGRATION;" U.S. patent application Ser. No. 13/937,545 filed Jul. 9, 2013 by Buehne et al. and entitled "ONLINE DATABASE MIGRATION;" and U.S. patent application Ser. No. 13/937,970 filed Jul. 9, 2013 by Masterson et al. and entitled "ADVANCED CUSTOMER SUPPORT SERVICES—ADVANCED SUPPORT CLOUD PORTAL". Each of these applications is hereby incorporated by reference for all purposes.

BACKGROUND

Migrating a complex database system can be a daunting task. Complex database systems are typically maintained by corporations, governments, and other large-scale entities (collectively referred to as customers) that have a limited ability to tolerate database systems being offline. As such, when mission-critical database systems are to be migrated from a first server system to a second (likely newer and more advanced) server system, the customer is likely desirable of an efficient and timely migration. Conventionally, database migrations are highly personnel intensive, requiring a person (or a team of persons) to identify and use their judgment in figuring out a strategic approach to performing the migration. Oftentimes, such human judgment can be time consuming and result in the implementation of a less than temporally optimal migration scheme.

SUMMARY

Various arrangements for managing migrations between server systems are presented. In some embodiments, a method for managing migration between server systems is presented. The method may include receiving, by a scheduler computer system, indications of a plurality of migration scripts to be executed during a migration of a database system from a source server system to a target server system. The method may include determining, by the scheduler computer system, an execution order for the plurality of migrations scripts based upon characteristics of a plurality of database objects to be migrated using the plurality of migration scripts and characteristics of the plurality of migration scripts. The method may include initiating, by the scheduler computer system, execution of a first migration script of the plurality of migration scripts according to the determined execution order. The first migration script may cause copying of a database object of the plurality of database objects from the source server system to the target server system.

Various embodiments of such a method may include one or more of the following features: The method may include, while the first migration script is being executed, receiving, by the scheduler computer system, an indication of a maximum number of migration scripts permitted to be executed in parallel. The method may include, based on the determined execution order and the maximum number of migration scripts permitted to be executed in parallel, initiating, by the scheduler computer system, execution of a second migration script of the plurality of migration scripts while the first migration script is executing. The method may include, while a subset of the migration scripts of the plurality of migration scripts are being executed and after the first migration script has completed, determining, by the scheduler computer system, an amount of available resources of the target server system exceeds a first threshold amount. The method may include, in response to determining the amount of available resources of the target server system exceeds the first threshold amount, initiating, by the scheduler computer system, an index creation for the database object copied to the target server system based on the first migration script. The index creation may be performed by the target server system. Determining the execution order for the plurality of migrations scripts may be based on execution dependencies of migration scripts of the plurality of migrations scripts on one or more other migration scripts of the plurality of migrations scripts.

Additionally or alternatively, embodiments of such a method may include one or more of the following features: The method may include, while a subset of the migration scripts of the plurality of migration scripts are being executed and after the first migration script has completed, determining, by the scheduler computer system, an amount of available resources of the target server system exceeds a first threshold amount. The method may include, based upon the determined execution order, execution of the first migration script being complete, and the amount of available resources of the target server system exceeding the first threshold amount, initiating, by the scheduler computer system, execution of a verification script that causes the target server system to count a number of records in a first database object copied to the target server system. Initiating the execution of the first migration script of the plurality of migration scripts according to the determined execution order may include causing, by the scheduler computer system, modification of a structure of the database object being copied to the target server system as compared to the structure of the database object as stored by the source server system. The modification of the structure may include the database object being copied to the target server system being compressed. Determining the execution order for the plurality of migration scripts may be based upon characteristics of the plurality of database objects to be migrated may include evaluating, by the scheduler computer system, storage sizes of individual database objects of the plurality of database objects; and, based on the evaluated storage sizes of the plurality of database objects, prioritizing, by the scheduler computer system, in the determined execution order the first migration script for the database object due to the database object having a larger storage size than one or more other database objects of the plurality of database objects.

Additionally or alternatively, embodiments of such a method may include one or more of the following features: The method may include while a subset of the migration scripts of the plurality of migration scripts are being executed and after the first migration script has completed, determining, by the scheduler computer system, an amount of available resources of the target server system exceeds a first threshold amount but does not exceed a second threshold amount, wherein the second threshold amount is greater than the first threshold amount. The method may include in response to determining the amount of available resources of the target server system exceeds the first threshold amount but not the second threshold amount, initiating, by the scheduler computer system, index creation for the database object copied to the target server system based on the first migration script instead of index creation for a second database object copied to the target server system based on a second migration script. Index generation for the second database object may be more resource intensive than index generation for a first database object. The determined execution order may indicate index generation for the second database object is to be performed before index generation for the first database object. The index creation may be performed by the target server system. The scheduler computer system may be selected from the group consisting of: the target server system; and the source server system.

In some embodiments, a system for managing migration between server systems is presented. Such a system may include a source server system, a target server system, and a scheduler computer system. The scheduler computer system may include one or more processors and a memory communicatively coupled with and readable by the one or more processors and having stored therein processor-readable instructions. When executed by the one or more processors, the processor-readable instructions may cause the one or more processors to receive indications of a plurality of migration scripts to be executed during a migration of a database system from the source server system to the target server system.

The processor-readable instructions may cause the one or more processors to determine an execution order for the plurality of migrations scripts based upon characteristics of a plurality of database objects to be migrated using the plurality of migration scripts and characteristics of the plurality of migration scripts. The processor-readable instructions may cause the one or more processors to initiate execution of a first migration script of the plurality of migration scripts according to the determined execution order. The first migration script may cause copying of a database object of the plurality of database objects from the source server system to the target server system.

Embodiments of such a system may include one or more of the following features: The processor-readable instructions may cause the one or more processors to, while the first migration script is being executed, receive an indication of a maximum number of migration scripts permitted to be executed in parallel. The processor-readable instructions may cause the one or more processors to, based on the determined execution order and the maximum number of migration scripts permitted to be executed in parallel, initiate execution of a second migration script of the plurality of migration scripts while the first migration script is executing. The processor-readable instructions, when executed, further cause the one or more processors of the scheduler computer system to, while a subset of the migration scripts of the plurality of migration scripts are being executed and after the first migration script has completed, determine an amount of available resources of the target server system exceeds a first threshold amount. The processor-readable instructions may cause the one or more processors to, in response to determining the amount of available resources of the target server system exceeds the first threshold amount, initiate an index creation for the database object copied to the target server system based on the first migration script. The index creation may be performed by the target server system. The processor-readable instructions for determining the execution order for the plurality of migrations scripts may be based on execution dependencies of migration scripts of the plurality of migrations scripts on one or more other migration scripts of the plurality of migrations scripts.

Additionally or alternatively, embodiments of such a system may include one or more of the following features: The processor-readable instructions may cause the one or more processors to, while a subset of the migration scripts of the plurality of migration scripts are being executed and after the first migration script has completed, determine an amount of available resources of the target server system exceeds a first threshold amount. The processor-readable instructions may cause the one or more processors to, based upon the determined execution order, execution of the first migration script being complete, and the amount of available resources of the target server system exceeding the first threshold amount, initiate execution of a verification script that causes the target server system to count a number of records in a first database object copied to the target server system. The processor-readable instructions for initiating the execution of the first migration script of the plurality of migration scripts according to the determined execution order may include processor-readable instructions, when executed, cause the one or more processors of the scheduler computer system to cause modification of a structure of the database object being copied to the target server system as compared to the structure of the database object as stored by the source server system.

Additionally or alternatively, embodiments of such a system may include one or more of the following features: The processor-readable instructions for determining the execution order for the plurality of migration scripts based upon characteristics of the plurality of database objects to be migrated may include processor-readable instructions, when executed, cause the one or more processors of the scheduler computer system to evaluate storage sizes of individual database objects of the plurality of database objects; and based on the evaluated storage sizes of the plurality of database objects, prioritize in the determined execution order the first migration script for the database object due to the database object having a larger storage size than one or more other database objects of the plurality of database objects. The processor-readable instructions may cause the one or more processors to, while a subset of the migration scripts of the plurality of migration scripts are being executed and after the first migration script has completed, determine an amount of available resources of the target server system exceeds a first threshold amount but does not exceed a second threshold amount, wherein the second threshold amount is greater than the first threshold amount. The processor-readable instructions may cause the one or more processors to, in response to determining the amount of available resources of the target server system exceeds the first threshold amount but not the second threshold amount, initiate index creation for the database object copied to the target server system based on the first migration script instead of index creation for a second database object copied to the target server system based on a second migration script. Index generation for the second database object may be more resource intensive than index generation for a first database object. The determined execution order indicates index generation for the second database object may be performed before index generation for the first database object. The index creation may be performed by the target server system. The scheduler computer system may be selected from the group consisting of: the target server system; and the source server system.

In some embodiments, a non-transitory processor-readable storage medium for managing migration between server systems is presented. The non-transitory processor-readable storage medium may include processor-readable instructions configured to cause one or more processors to receive indications of a plurality of migration scripts to be executed during a migration of a database system from a source server system to a target server system. The processor-readable instructions may further cause the one or more processors to determine an execution order for the plurality of migrations scripts based upon characteristics of a plurality of database objects to be migrated using the plurality of migration scripts and characteristics of the plurality of migration scripts. The processor-readable instructions may further cause the one or more processors to initiate execution of a first migration script of the plurality of migration scripts according to the determined execution order. The first migration script may cause copying of a database object of the plurality of database objects from the source server system to the target server system.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
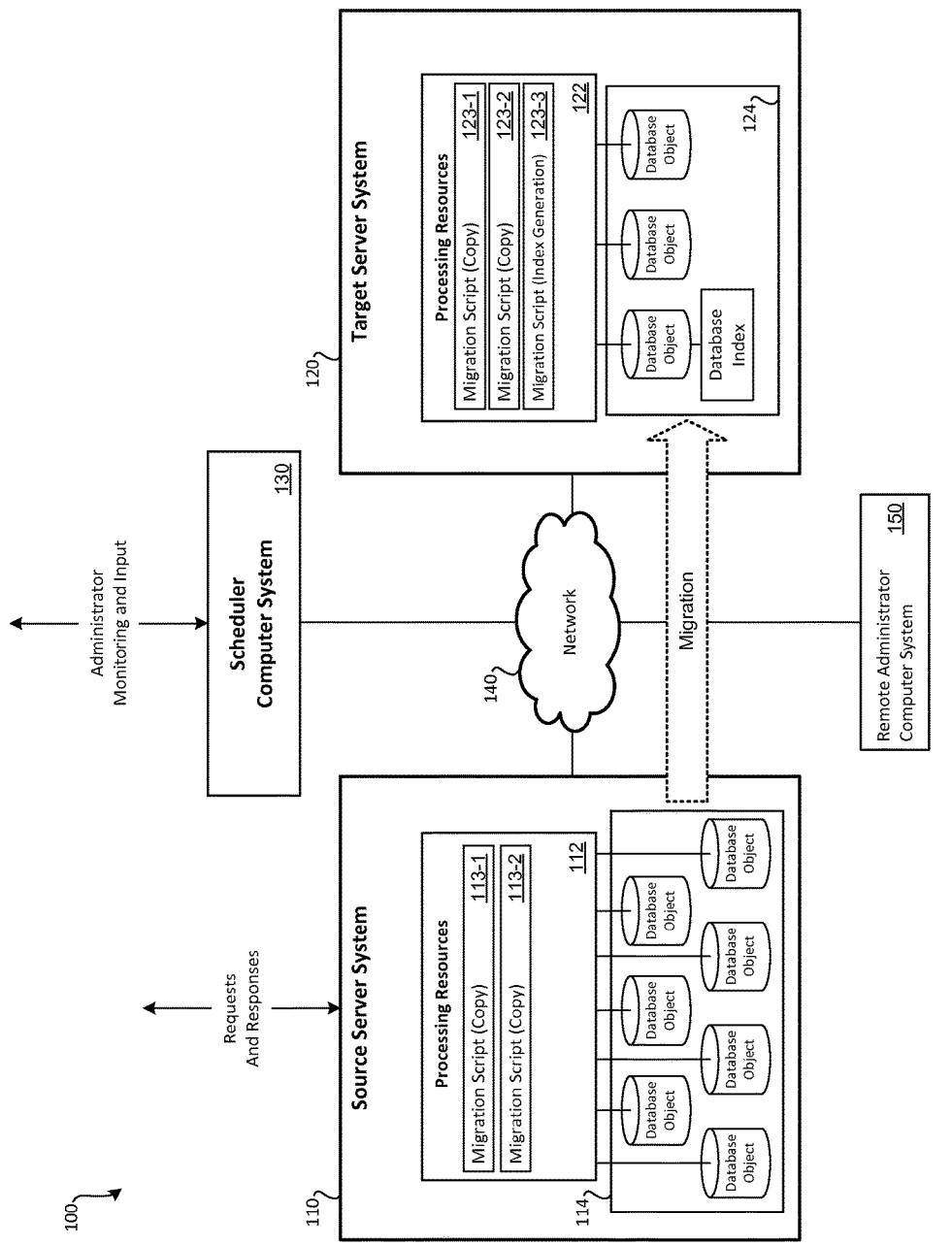
FIG. 1 illustrates an embodiment of a system configured to manage and perform a migration between server systems.

Rather than having an on-site (or remote) administrator determine the optimal procedure for migrating a database installation from a source server system to a target server system, it may be more effective (e.g., the migration may be performed in a shorter period of time) to have the migration at least partially managed by a scheduler system that is configured to dynamically control migration of the database installation from the source computer system to the target computer system.

A "source server system" may refer to a grouping of one or more computer systems that stores and executes a database installation. The source server system may fulfill retrieval, update, and other forms of database queries. A "migration" may refer to moving or copying the database installation to a target server system from the source server system. Therefore, prior to migration, the database installation may only be available on the source server system. Following the migration, the database installation may be present on the target server system and, possibly, still present on the source server system. The "target server system" may refer to a grouping of one or more computer systems that stores the database installation after the migration. The target server system may execute the database installation and fulfill retrieval, update, and other forms of database queries following the migration.

A migration can involve multiple types of steps. First, "database objects" (such as tables, etc.) may need to be copied from the source server system to the target server system. Such databases and associated data storage arrangements may range from small to enormous (e.g., hundreds of gigabytes, multiple terabytes, etc.). Copying of the database objects from the source server system to the target server system may be performed while the source application is offline (and, thus, there are no application requests to create, delete, and/or update database entries). In some embodiments, copying may occur while the source server system is online (and, thus, is processing requests and/or updating database entries). As such, modifications to database objects may be logged such that the databases and associated data storage arrangements copied to the target server system may be brought up-to-date.

Second, after a database has been copied from the source server system to the target server system, one or more table dependent objects will likely need to be generated for the database copied to the target server system. Such indexes may allow for faster and/or more efficient querying of the database at the target server system.

Third, after a database has been copied to the target server system, a customer may expect at least some level of verification to be performed on the database at the target server system to ensure the copy was performed correctly and/or fully. In some embodiments, a row count of the copied database as stored by the target server system is compared with a row count of the database as stored by the source server system. If the row counts match, the customer can be at least assured that no records were lost during the migration.

As such, during a migration, at least three major functions may be performed: a copy function, a dependent object generation function, and a verification function. However, it should be understood that in some embodiments, a function may be omitted, such as the verification function. While some of these functions are dependent on other functions, some functions may be performed in parallel. As an example of a dependent function, index generation for a table, coped during the migration processor, to be performed by the target server system may only be performed once the copy of the table to the target server system from the source server system has been completed. However, the copying and index generation of a first table may be performed independently of the copying and index generation of a second table. As such, at least some functions to be performed during a migration may be performed in parallel.

A scheduler system may be configured to manage migration from a source server system to a target server system. The scheduler system may be configured to identify an order of copying database objects. The execution order identified by the scheduler system may be based on factors such as the size of the database objects to be migrated, the dependencies of the database objects, the object data types, and/or the application type. The scheduler system may analyze available system resources of the source server system and/or the target server system to schedule functions (e.g., index generation and/or verifications functions). It must be configurable to meet the current configuration of source and target systems (e.g., the way export dump files are made available on the target system by using NFS or a copy method). Further, the scheduler system may be able to take input from an administrator, who may provide various preferences before and during the migration. For example, the administrator may able to dynamically alter the number of migration functions permitted to performed in parallel by the source server system and the target server system during the migration via the scheduler system, to load the available migration resources (e.g., memory resources, processing resources, network bandwidth resources) in an efficient way). Moreover, various types of functions may be scheduled by the scheduler system concurrently. For example, while a copy function between the source server system and the target server system is being performed, more available processing resources may be available at the target server system. The scheduler, if it determines that a sufficient amount of processing resources is available, may schedule execution of index generation by the target server system in parallel for a table which has already been copied to the target server system.

FIG. 1 illustrates an embodiment of a system 100 configured to manage and perform a migration between server systems. System 100 may include source server system 110, target server system 120, scheduler computer system 130, network 140, and remote administrator computer system 150.

Source server system 110 may represent one or more computer systems. Source server system 110 may store and execute a database installation. Source server system 110 may fulfill retrieval, update, and other forms of database queries and functions. Prior to migration, the database installation may be available on the source server system but not target server system 120. Source server system 110 may include processing resources 112 and storage resources 114. Processing resources 112 may include one or more processors configured to execute multiple processes simultaneously. For example, processing resources 112 are illustrated as executing two migration scripts simultaneously: migration script 113-1 and migration script 113-2. Migration scripts 113 executed by processing resources 112 may be copy scripts configured to copy a database or other storage arrangement from source server system 110 to target server system 120. Execution of migration scripts 113 may be initiated by another system accessible via network 140.

Source server system 110 may have storage resources 114 which may represent one or more (non-transitory) computer-readable storage mediums (e.g., hard drives, solid-state drives) which store databases, indexes, and/or other forms of database objects. Some database objects may be copied to target server system 120 as part of a database migration. Typically, a database installation at a source server system 110 may include a large number (e.g., hundreds, thousands, millions) of database objects which may consume a large amount of storage resources. As such, a copy of some database objects from source server system 110 to target server system 120 may take a significant amount of time to perform.

In the illustrated embodiment of source server system 110, two migration scripts are being executed by source server system 110. Migration scripts 113 may each result in a particular database object being copied from storage resources 114 to target server system 120. This migration of the database objects is represented by the dotted migration arrow. Migration scripts 113 performed by source server system 110 may be performed in parallel.

Target server system 120 may represent one or more computer systems. Target server system 120 may store and execute a database installation after the migration is complete. Typically, target server system 120 may be a faster, newer group of one or more computer systems than source server system 110 (which may be why the migration is being performed). After the migration, source server system 110 may be intended to fulfill retrieval, update, and other forms of database queries. Prior to migration, the database installation may be available on the source server system but not target server system 120. Following migration, the database installation may be available on target server system 120. Target server system 120 may include processing resources 122 and storage resources 124. Processing resources 122 may include one or more processors configured to execute multiple processes simultaneously. For example, processing resources 122 are illustrated as executing three migration scripts simultaneously: migration script 123-1, migration script 123-2, and migration script 123-3. Migration scripts 123 executed by processing resources 122 may be copy scripts configured to receive a database or other storage arrangement from source server system 110 for storage by target server system 120. As such, migration script 113-1 may cause a database object to be copied from source server system 110 while migration script 123-1 serves to receive and create a corresponding database object at target server system 120.

Based on configuration of the scheduler system and/or of the migration scripts, one or more database objects copied to the target server system may be modified as compared to the same database object as stored by the source server system. For example, the created database object at the target server system may be compressed, while the corresponding database object stored by source server system 110 was uncompressed. In some embodiments, one or more database objects as stored by target server system 120 may be structured differently than the corresponding database object stored by source server system 110.

The processing resources 122 of target server system 120 may execute migration scripts that cause index generation. An index may allow a database stored by target server system to be accessed more efficiently (e.g., on the basis of time and/or usage of processing resources). Once a table has been copied from source server system 110 to target server system 120, an index may be created for this table. As such, only database table objects may be copied from source server system 110 to target server system 120, such as databases. Other forms of database objects, such as database indexes, primary keys, referential constraints, and/or views may be created by the target server system 120 rather than be copied from source server system 110. In the illustrated embodiment of system 100, target server system 120 is executing a migration script 123-3 that is creating an index file for a table stored by storage resources 124.

Storage resources 124 may represent one or more (non-transitory) computer-readable storage mediums of target server system 120, such as hard drives and solid state drives. Storage resources 124 may store databases and other database objects copied from storage resources 114 of source server system 110. Storage resources 124 may additionally store database objects, such as a database indexes, created by target server system 120.

Additionally, processing resources 122 may perform migration scripts that confirm that copied database objects stored by target server system 120 match the source database object stored by source server system 110. Such a verification migration script may involve a row count being performed on both database objects to determine if the counts match (individual data element comparisons may not be performed). Migration scripts 123 performed by target server system 120 may be performed in parallel.

Network 140 may include one or more networks that can be used for communication between source server system 110 and target server system 120. Network 140 may include one or more public networks, such as the Internet and/or one or more private networks such as a corporate intranet. In some embodiments, a direct connection may be present between source server system 110 and target server system 120 to facilitate faster data transfers. Network 140 may also permit communication between source server system 110, target server system 120, a scheduler computer system 130, and remote administrator computer system 150.

Scheduler computer system 130 may represent a computer system separate from source server system 110 and target server system 120. Alternatively, functions of scheduler computer system 130 may be performed by either source server system 110 or target server system 120. For example, in some embodiments, a scheduler may be executed by target server system 120. Scheduler computer system 130 may be configured to control when migration scripts are executed by source server system 110 and target server system 120. Given a listing of migration scripts to be executed, scheduler computer system 130 may be configured to determine an order of execution to optimize the migration from source server system 110 to target server system 120. Scheduler computer system 130 may be configured to query source server system 110 and/or target server system 120 to determine the amount of processing resources available at each server system. Based on an assessment of processing resources available, the number and/or which migration scripts are executed by source server system 110 and/or target server system 120 may be varied.

In some embodiments, an administrator who is managing the migration may provide input directly to scheduler computer system 130. Such input may occur during the migration; therefore, the administrator may be able to modify characteristics of the migration process while the migration is in progress. The administrator may be permitted to define particular parameters that govern scheduler computer system 130. For instance, the administrator may define a maximum number of migration scripts which can be executed simultaneously by source server system 110 and/or target server system 120. In other embodiments, rather than the administrator providing input directly to scheduler computer system 130, the administrator may use remote administrator computer system 150 to provide input to scheduler computer system 130. Therefore, an administrator may be able to perform the migration in a cloud-based arrangement. The scheduler computer system 130 and/or remote administrator computer system 150 may be remotely located from source server system 110 and/or target server system 120. Therefore, an administrator, who may be hired on a contract basis, such as from the company that produced the database software, may be able to perform a cloud-based migration of the database installation from source server system 110 to target server system 120.

Figure 2:
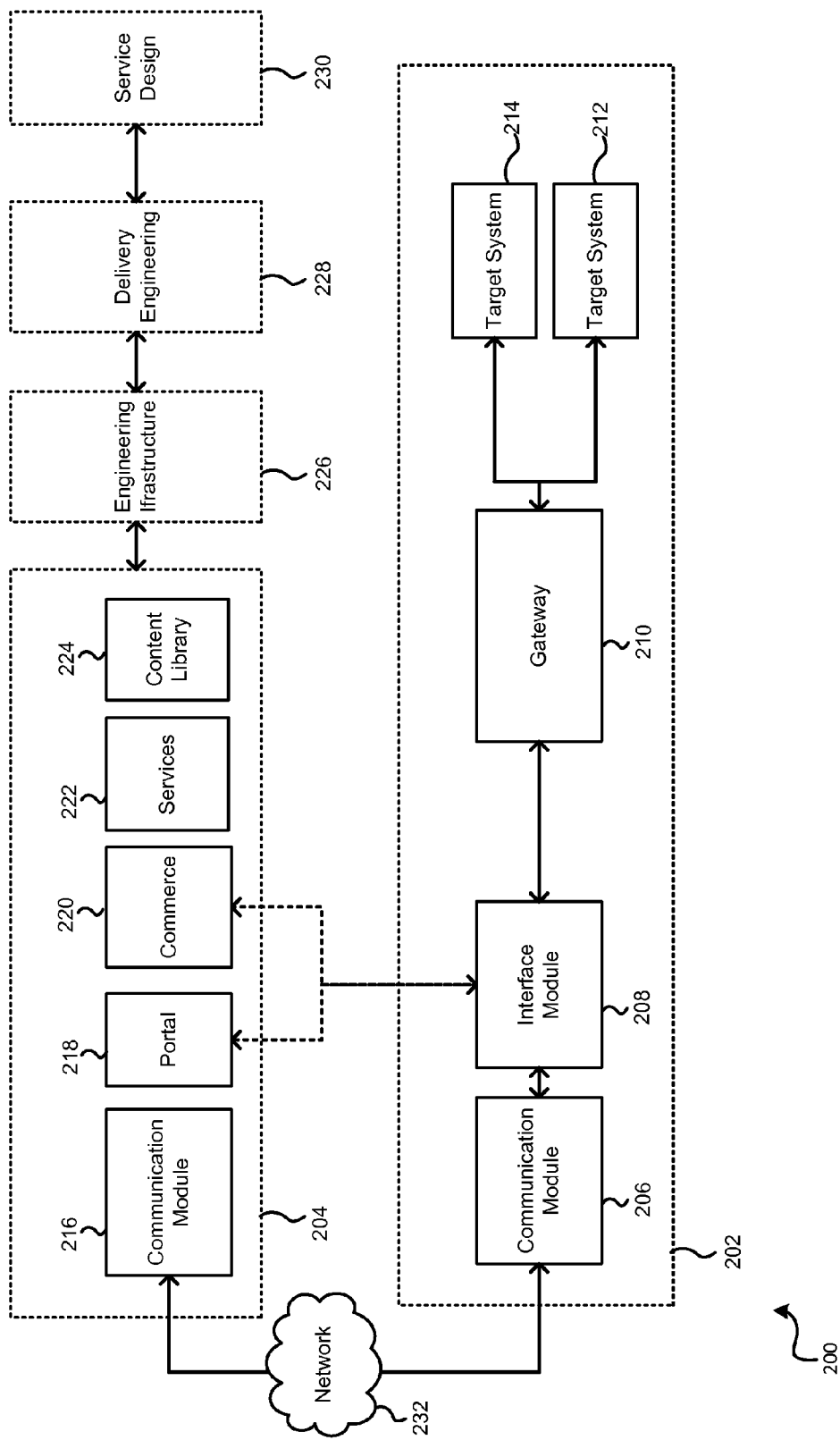
FIG. 2 illustrates an embodiment of a support cloud platform.

FIG. 2 illustrates an embodiment of a support cloud platform 200. The platform may be used to implement a service, such as a migration from a customer's source server system to the customer's target server system. Services may be designed, made available for deployment, deployed to a customer, and monitored using the platform. The customer data center 202 may include one or more target systems 212, 214 (one of which may be the customer's source server system, the other being the customer's target server system) that may be the target of the services provided by the platform. The target systems may be servers, computers, rack systems, and the like that run or execute a database and/or other database software used by a customer. A target system may be a hardware or software entity that can have service delivered and may be a host, database, web logic service, and/or the like. In the customer data center 202, the target systems 212, 214 may be managed by an administrator local to the customer data center 202. The administrator may have physical access to the target systems 212, 214. The support cloud platform 200, may provide for the administration and other services of the target systems via a remote interface from a remote location. As such, support cloud platform 200 may serve as a platform for how remote administrator computer system 150 of FIG. 1, interacts with the migration from source server system 110 to target server system 120. A gateway 210, located on the customer data center 202 provides remote access to the customer data center 202 and one or more target systems 212, 214. The gateway 210 may be a hardware or virtual software appliance installed at the customer data center. The gateway 210 connects to a production cloud 204 of a service provider via a secure connection using a communication module 206 over a network 232 (which may represent network 140 of FIG. 1). The gateway 210 may optionally have an interface module 208 allowing control of the interactions of gateway 210 to the production cloud 204 of the service provider.

Services may be generated and developed using a common service development framework of the platform. The common service development framework may include a service design 230, delivery engineering 228, and engineering infrastructure 226 modules. The common service development framework may leverage common components that can be used throughout the delivery process (manual and/or automated), and may enable the efficient design, development, testing and release of a service. The common service development framework of the platform enables at least partial automation of the development of a service.

The platform enables delivery engineers to automate the service they are developing and implementing. In some embodiments, the development of services may be automated or simplified with the use of reusable components. For example, many of the same deployment, execution, and error handling function used in the services may be designed as reusable components. The components may be reused in many services allowing the design and coding of the service to be focused on the new core functionality of the service. Using the platform, services may be designed and implemented in one or more central locations. A centralized service design and development platform enables a hierarchical and structured service design with reusable components and modules. The development of a service may be, at least in part, automated since a large portion of the components of a service may assembled from existing reusable components.

After the services are designed, developed, and tested, they may be stored at the production cloud 204. For example, a service may include modification replicator 116 of FIG. 1, which may be installed at the source server system of the customer ahead of an online migration. Similarly, the functionality of scheduler computer system 130 of FIG. 1 may be implemented as a service that is deployed from production cloud 204. The production cloud 204 may include a library of services 222 and a content library 224. The services and content may be deployed from the production cloud 204 to one or more target systems 212, 214 at a customer data center 202. The deployment, monitoring, and the like of services may be arranged with interaction from the portal 218 and commerce module 220 at the production cloud 204 and the gateway 210 and an interface module 208 at the customer data center 202 via the communication modules 206, 216. The design, deployment and monitoring of the service may be performed remotely from production cloud without the need of an administrator or engineer at the customer data center 202. The portal 218 of the platform may provide for remote control and administration of services, control of deployment, and analysis of results.

The platform of FIG. 2 may be used to develop, deploy and manage, services for the customer data center 202 and target systems 212, 214. A gateway 210 has access to the target systems 212, 214. Services, in the forms of software, scripts, functions, and the like, may be downloaded from the production cloud 204. The commerce module 220 and the portal for the production cloud 204 provide an interface, selection tools, monitoring tools, for selecting the services, and monitoring the services to be deployed in the customer data center 202. An administrator at the customer data center 202 may view, select, and monitor the services using the portal 218 and commerce module 220. The customer may access the portal 218 and commerce module 220 using interface module 208 at the customer data center 202. The interface module may have a direct or an indirect access to the portal 218 and the commerce module via the communication module 206. For example, using the support cloud platform 200, a service may be selected using the commerce module 220. The commerce module 220 may be accessed using the interface module 208. Once a service is selected and configured for the target systems 212, 214, the service may be deployed from the production cloud 204 to the customer data center 202 via the gateway 210. The gateway may deploy the service on to the target systems. The gateway 210 may be used to gather data statistics, monitor services, and receive system information about the customer data center and the target systems. The data may be processed, analyzed, and transmitted to the production cloud. The data may be used to suggest or deploy services to the customer, present statistics or metrics of the customer's target servers using the portal 218. Therefore, without an administrator coming to the customer's site to access the source server system and target server system in person, an administrator may be able to perform a migration from the source server system to the target server system.

Figure 3:
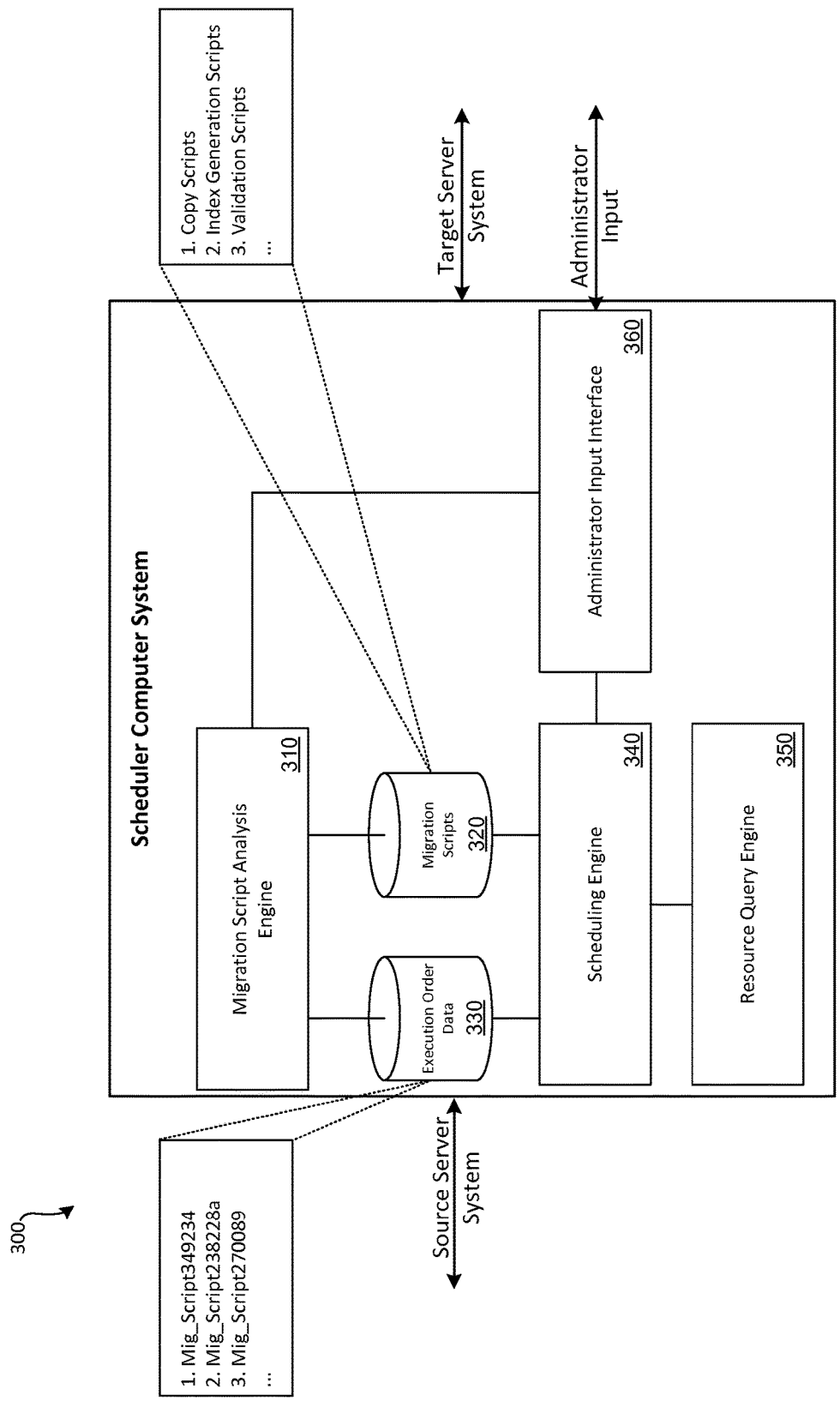
FIG. 3 illustrates an embodiment of a system configured to manage a migration between server systems.

FIG. 3 illustrates an embodiment of a scheduler computer system 300 configured to manage a migration between two (or more) server systems. Scheduler computer system 300 may represent scheduler computer system 130 of FIG. 1. Scheduler computer system 300 may also be implemented in a system other than the arrangement of system 100 of FIG. 1. Scheduler computer system 300 may be implemented using one or more instances of computer system 700 of FIG. 7. Scheduler computer system 300 may include: migration script analysis engine 310, migration script storage arrangement 320, execution order storage arrangement 330, scheduling engine 340, resource query engine 350 and/or administrator input interface 360. Each of these components may be implemented using (non-transitory) computer-readable storage mediums and/or processors. Functions performed by these components may be implemented using hardware, firmware, and/or software executed by one or more computer systems. As such, functions of multiple components may be performed by a single processor. Alternatively, functions of a component may be executed by multiple processors.

Migration script storage arrangement 320 may store migration scripts created for use in migrating a source server system to a target server system, such as illustrated in FIG. 1. While FIG. 3 illustrates migration script storage arrangement 320 stored by scheduler computer system 300, in other embodiments, migration script storage arrangement 320 may be stored remotely, such as by target server system, source server system, and/or by some other computer system. At a minimum, scheduler computer system 300 may have access to migration script storage arrangement 320 (which may be located elsewhere). Execution of all of the migration scripts of migration script storage arrangement 320 may be necessary to perform the migration from the source server system to the target server system. Migration script storage arrangement 320 may contain migration scripts which perform copy functions, index generation functions, and/or verification functions. Other functions are additionally possible.

Migration script analysis engine 310 may analyze the stored migration scripts of migration script storage arrangement 320 and/or the database objects to which the migration scripts refer. Migration script analysis engine 310 may determine a more optimal order in which to perform the migration scripts to minimize the amount of time necessary to perform the migration. The time needed to migrate (e.g., copy and create dependent objects) a database object (that is a database table and its dependent objects (e.g. indexes, constraint definitions), depends on the database object size and the data types used. Depending on the used data types, different migration methods can be used to minimize the migration time for a particular table. Migration script analysis engine 310 may analyze the size of the database objects to be transferred. In at least some embodiments, it may be efficient to transfer large databases (or other database objects) near the beginning of a migration, therefore preventing the end of the migration process from getting delayed, waiting for the large database to transfer (and then performing functions dependent on the transfer of that database). Further, the verification of the database may only be performed once the database has been transferred. As such, migration script analysis engine 310 may determine which databases and/or other database objects are the largest and may prioritize their migration from the source server system to the target server system such that the transfer occurs earlier during the migration.

Migration script analysis engine 310 may also analyze dependencies among migration scripts. Migration script analysis engine 310 may ensure that migration scripts which require another migration script to be performed first are initialized in an acceptable order. For example, migration script analysis engine 310 may ensure that a copy function for a database is performed before an index generation function and/or verification function for the database is performed.

Migration script analysis engine 310 may enforce various other rules that have been predefined in scheduler computer system 300. For instance, administrators who have performed many migrations may configure various rules that migration script analysis engine 310 follows when determining an execution order of migration scripts. For example, based on the object size and data types used by a particular table, the administrator can determine the migration method to be used for this table. Based upon the chosen migration method, the analysis software will determine the order of execution automatically. For a table, one or more of the following rules may apply: 1) Copy the table data to the target system. 2) If a datapump (or other form of server based bulk data movement infrastructure) or export function is used, dump files may be required to be made available on the target. Therefore, a copy process may be needed. 3) If datapump is used and table compression is active, an SQL script must be executed on the target server system to create a compressed table before starting the import from the source server system. 4) Once the table is loaded, the row count verification on the source server system can be started. 5) In parallel with rule four, the index/PK (primary key) constraint creation can be started for this table on the target server system. 6) Once the first index is created at the target server system, the row count verification can be started on the target server system in parallel. 7) Once all indexes for a table have been created, table/index statistics from the source system can be imported for this table. 8) Once all tables are loaded to the target server system, any outstanding foreign key definitions can be created at the target server system.

The determined order of execution for the migration scripts may be stored in execution order storage arrangement 330. Execution order storage arrangement 330 may indicate an order that migration script analysis engine 310 has determined to be preferable for performing the migration quickly. Execution order storage arrangement 330 may also store data that indicates dependencies as to which migration scripts can and/or cannot be performed before other migration scripts have completed. While execution order storage arrangement 330 stores a preferable order for performance of migration scripts, the actual execution order of scripts may be dynamically modified by scheduler computer system 300 based on conditions during the migration as determined. Further, an administrator may reorder initialization of the execution of migration scripts during the migration (e.g., while migration scripts are being executed).

Resource query engine 350 may periodically or sporadically determine the amount of processing resources available at the source server system and/or the target server system. Based on the amount of resources available, the execution order of migration scripts may be altered from the previously determined execution order. For example, if a target server system has a significant amount of available processing resources but the source server system has few available processing resources and/or the bandwidth between the source server system and the target server system is already operating near capacity, a migration script which consumes significant processing resources of the target server system (but not the source server system) may be initiated. For instance, execution of an index generation migration script for a table at the target server system may be initiated. Generation of which index may be contingent on the amount of processing resources available and/or an estimation of the amount of time the processing resources are expected to remain available. For instance, if a smaller amount of processing resources is available, an index for a smaller table may be generated. If a larger amount of processing resources is available, an index for a larger table may be generated. The amount of processing resources required to be available for such a migration script to be initiated may be contingent on predefined thresholds stored by scheduler computer system 300. In some embodiments, resource query engine 350 may periodically poll the source server system and/or the target server system. In other embodiments, the source server system and/or the target server system may be polled on request by scheduling engine 340.

Scheduling engine 340 may be configured to determine the timing for when migration scripts from migration script storage arrangement 320 are to be initialized. When initialized, a migration script may be executed by the source server system and/or the target server system. Scheduling engine 340 may determine the timing for initialization of the execution of a migration script based on the execution order previously determined by migration script analysis engine 310, the amount of resources available at the target server system and/or source server system (as determined by resource query engine 350), and/or parameters defined by an administrator, such as the maximum number of migration scripts permitted to be executed by the source server system and/or the target server system simultaneously. Therefore, while scheduling engine 340 may use the execution order in determining the order in which to initialize migration scripts, other factors may affect the actual ordering of initialization of migration scripts.

Administrator input interface 360 may permit an administrator to provide input to scheduler computer system 300 and/or receive feedback on the performance of the migration. Administrator input interface 360 may allow an administrator to interact locally with scheduler computer system 300 and/or interact with scheduler computer system 300 remotely, such as via a cloud-based gateway and portal. Administrator input interface 360 may permit the administrator to define parameters for scheduler computer system 300 prior to the scheduler computer system creating an execution order and scheduler computer system 300 initiating migration scripts for execution by the source server system and/or the target server system. Administrator input interface 360 may also permit an administrator to dynamically modify the scheduler computer system while scheduling engine 340 is determining which migration script should be executed by the source server system and/or the target server system. For example, while the migration is in progress, the administrator may modify the maximum number of migration scripts permitted to be performed in parallel by the source server system. In response to such input provided via administrator input interface 360, scheduler computer system 300 may not schedule more than the maximum number of migration scripts to be executed simultaneously by the source server system.

Figure 4:
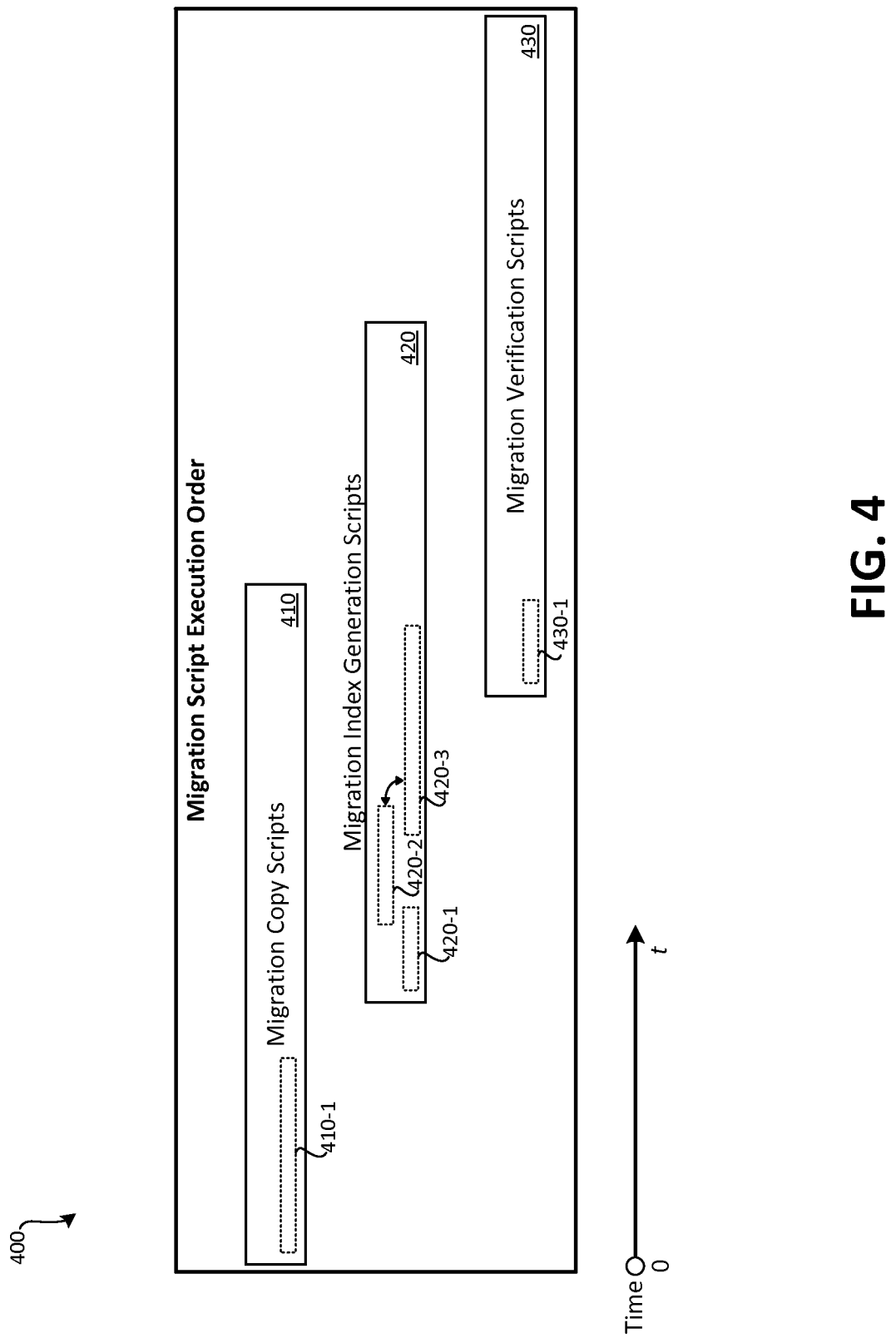
FIG. 4 illustrates an embodiment of a visual representation of concurrent migration script scheduling as initiated by a scheduler computer system.

FIG. 4 illustrates an embodiment 400 of a visual representation of concurrent migration script scheduling as initiated by a scheduler computer system. For example, the scheduler computer system that scheduled the migration scripts of embodiment 400 may be scheduler computer system 300 of FIG. 3 and/or scheduler computer system 130 of FIG. 1. Embodiment 400 illustrates migration copy scripts 410, migration index generation scripts 420, and migration verification scripts 430 being executed during partially overlapping time periods.

Migration copy scripts 410 may be executed by the source server system and the target server system. For example, a migration copy script of migration copy scripts 410 may be executed by the source server system to retrieve and transmit a particular database object to the target server system. A migration copy script of migration copy scripts 410 may be executed by the target server system to receive and store the database object. At a given time, multiple migration copy scripts 410 may be performed simultaneously by the source server system and/or the target server system.

Migration index generation scripts 420 may be executed by the target server system to generate indexes for received tables. For example, a migration copy script 410-1 of migration copy scripts 410 may be executed to retrieve, transmit, and store a particular database object by the target server system. Since index generation may be dependent on the associated table already having been copied, migration index generation script 420-1 may be initiated at the target server system sometime after migration copy script 410-1 is complete. At a given time, multiple migration index generation scripts 420 on different tables may be performed simultaneously by the target server system. Further, migration index generation scripts 420 may be performed simultaneously to some migration copy scripts 410 being executed, such as a migration copy script directed to a different table than the migration index generation script. Generally, migration index generation scripts 420 can begin after at least one table has been migrated to the target server system.

Migration verification scripts 430 may be executed by the source server system (to count rows in the original databases) and by the target server system (to count rows in the copied, migrated databases) for comparison. Migration verification scripts 430 may be dependent on the tables already having been migrated to the target server system, as such a corresponding migration copy script, such as migration copy script 410-1 for migration verification script 430-1 may need to be performed. Migration verification scripts 430 may be performed simultaneously to some migration copy scripts 410 and/or migration index generation scripts 420 being executed. For example, migration copy scripts directed to a different table than migration verification script 430-1 may be executed simultaneously.

As previously detailed in relation to FIG. 3, while an execution order determined by a migration script analysis engine may define an optimized execution order for initializing migration scripts, this execution order may be dynamically reordered by a scheduling engine during the migration to better utilize available resources (e.g., processing resources) and allow the migration to complete in an efficient (e.g., timely) manner. Referring again to FIG. 4, migration index generation script 420-2 is illustrated as being initialized for execution before migration index generation script 420-3. However, the execution order may have specified that migration index generation script 420-3 was scheduled to be performed before migration index generation script 420-2. The scheduler computer system may have reordered initialization of these two migration scripts due to the amount of available processing resources at the target server system, as indicated by the arrow between migration index generation script 420-2 and migration index generation script 420-3. For example, based on an amount of processing resources needed to perform the migration script as estimated by the scheduler computer system, a decision may be made as to whether enough processing resources are available. For example, to perform migration index generation script 420-3, a first threshold amount of processing resources may need to be available at the target server system. To perform migration index generation script 420-2, a second (smaller) threshold amount of processing resources may need to be available at the target server system. Therefore, if the second threshold amount of processing resources is available but not the first threshold amount of processing resources, the scheduling computer system may dynamically reorder the execution order such that migration index generation script 420-2 is performed before migration index generation script 420-3.

While the above example focuses on reordering of two migration index generation scripts of migration index generation scripts 420, it should be understood that similar reordering of the execution order may be performed for migration copy scripts and/or migration verification scripts. Further, migration scripts of different types may also be reordered (e.g., a migration verification script may be performed before a migration index generation script despite the execution order initially specifying the reverse order).

While FIG. 4 illustrates several specific migration scripts, it should be understood that this may be a simplification for illustration purposes. In an implemented embodiment, thousands of migration scripts may be present. Further, additional or fewer types of migration scripts may be performed.

Figure 5:
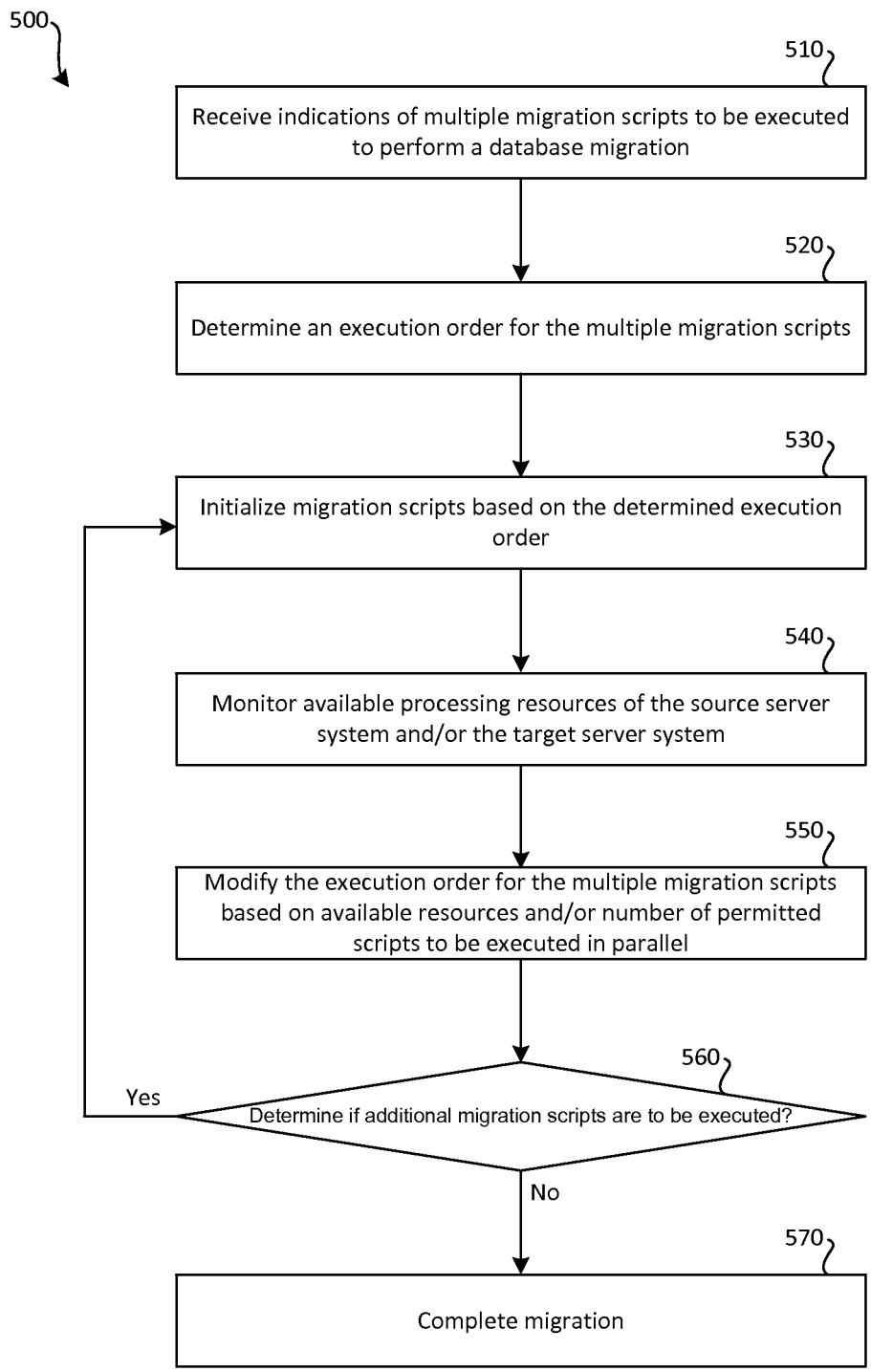
FIG. 5 illustrates an embodiment of a method for managing a migration between server systems.

FIG. 5 illustrates an embodiment of a method 500 for managing a migration between server systems. Method 500 may be performed by system 100 of FIG. 1 or some other system configured to perform a migration between server systems. A scheduler computer system, such as scheduler computer system 300 of FIG. 3, which may be a separate computer system, part of the source server system, or part of the target server system, may perform the steps of method 500. Therefore, to perform the steps of method 500 on one or more computer systems, computer system 700 of FIG. 7 may be used. Means for performing each step of method 500 may include one or more instances of the components discussed in relation to scheduler computer system 300 of FIG. 3 and/or computer system 700 of FIG. 7.

At step 510, indications of multiple migration scripts may be received. Each of these migration scripts may be intended for execution to perform a migration from a source computer system to a target computer system. The migration scripts may have been generated by a component other than the scheduler computer system. The scheduler computer system may receive an indication of each migration script. For example, the scheduler computer system may be pointed to a file storage arrangement where the migration scripts are stored. The migration scripts themselves may be provided to the scheduler computer system or, in some embodiments, a listing (e.g., table) of the migration scripts may be provided to the scheduler computer system. An administrator, whether local or remote to the scheduler computer system, may cause the scheduler computer system to receive the indications of the multiple migration scripts which will be executed to cause the migration of the database system from the source computer system to the target server system.

At step 520, the scheduler computer system may determine an execution order in which the migration scripts as indicated at step 510 will be initialized for execution. The actual execution of the migration scripts may be performed by the source server system and/or the target server system. The execution order determined by the scheduler computer system may be based on various factors. A first factor may be dependencies of the migration scripts. For a particular database to be migrated, at least three migration scripts may be present, which may need to be performed in order. For example, a migration copy script may need to be performed before a migration index generation script and/or a migration verification script is performed for a same database.

At step 530, execution of one or more of the migration scripts may be initialized. This may involve one or more migration scripts being executed by the target server system and/or the source server system in parallel. The initialization of migrations scripts may be at least partially based on the execution order determined at step 520. Attributes defined by an administrator, who may be local or remote to the scheduler computer system, may also affect which migration scripts and how many migration scripts are initialized to execute in parallel.

At step 540, the amount of available resources available at the source server system and/or the target server system may be monitored. The resources monitored may include processing resources and/or communication bandwidth between the source server system and the target server system. If the source server system is online during the migration, the amount of available resources may be affected by incoming database requests. In many instances, the target server system will have more available processing resources than the source server system possibly due to the target server system being a more advanced system and/or the target server system not being online to fulfill database requests.

At step 550, the execution order for the multiple migration scripts may be modified based on the amount of available resources at the source server system and/or the target server system. For example, if the target server system has a sufficient amount of processing resources available, an additional migration script may be executed in parallel with other migration scripts. For example, migration copy scripts may involve little use of processing resources by the target server system. As such, a migration index generation script may be executed by the target server system in parallel which will use some or all of the available processing resources. The scheduler computer system may be configured to estimate an amount of processing resources and/or a time duration which will be needed to perform a particular migration script. This estimation may be used to determine whether (and which) migration script should be executed. In addition to modifying the execution order based on the available amount of processing resources, an administrator may be permitted to define a maximum number of migration scripts permitted to be executed in parallel. As such, the administrator may increase or decrease the maximum number while the migration is being performed. As such, if the administrator decreases the number of migration scripts permitted to be executed in parallel by the source server system and/or the target server system, execution of one or more migration scripts may be paused and resumed at a later time or aborted and restarted at a later time. If the administrator increases the number of migration scripts permitted to be executed in parallel by the source server system and/or the target server system, scheduler computer system may initiate execution of one or more additional migration scripts by the source server system and/or the target server system.

At step 560, a determination may be made if additional migration scripts are to be executed. Such a determination may be based on whether any migrations scripts that are present in the execution order have yet to be initiated. If all of the migration scripts have been initiated, execution of the migration scripts currently executing may be permitted to complete and then the migration may be identified as complete at step 570. If additional migration scripts are to be executed, method 500 may return to step 530 such that one or more additional migration scripts can be initiated based on the now modified execution order. It should be understood that modifying the execution order may also be performed by examining the execution order determined at step 520 and initializing a migration script from the execution order out of order. Steps 530 through 560 may repeat until the migration is complete. During this time, an administrator may be defining attributes which define how the scheduler system manages the migration from the source server system to the target server system.

Figure 6:
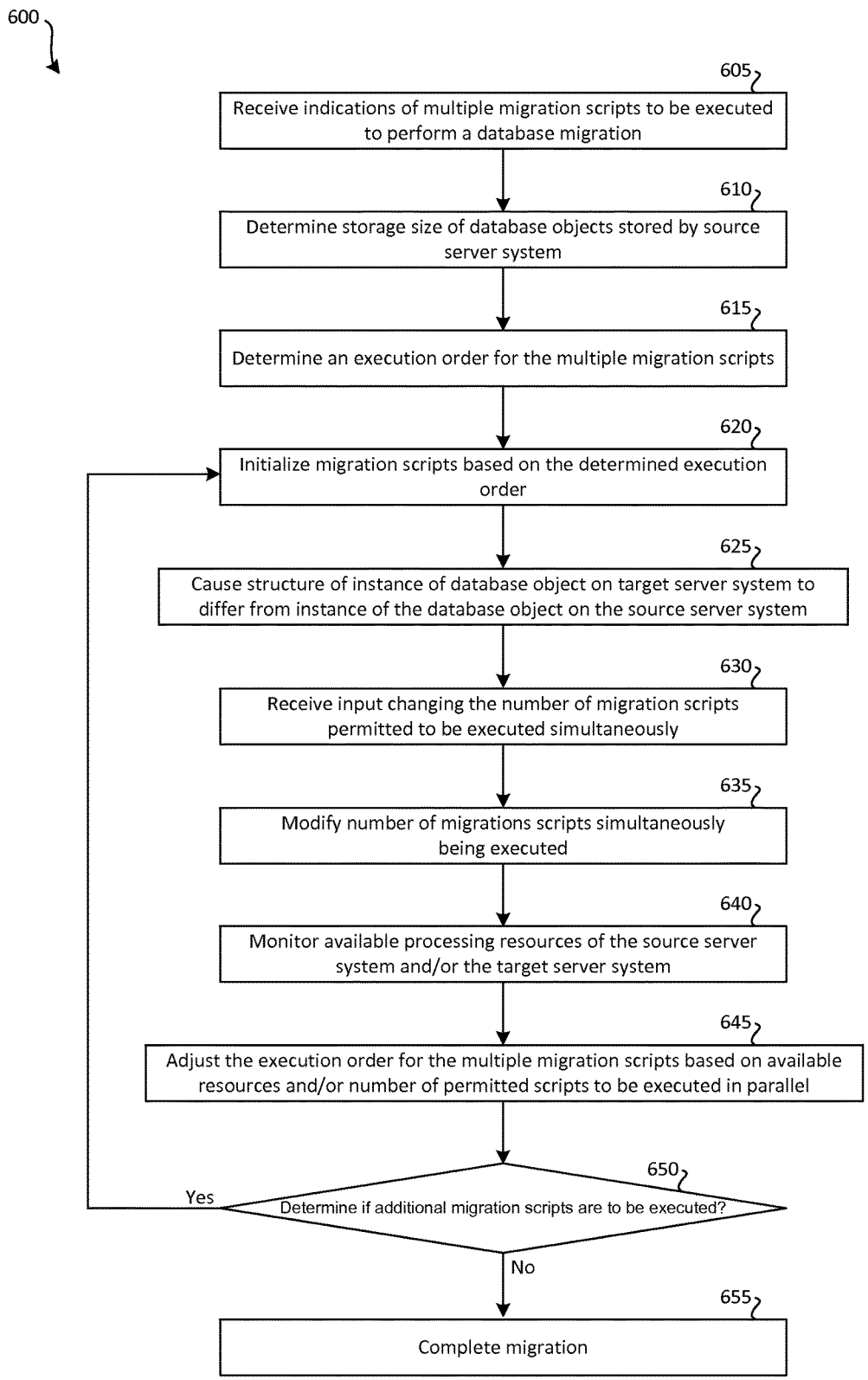
FIG. 6 illustrates another embodiment of a method for managing a migration between server systems.

FIG. 6 illustrates another embodiment of a method for managing a migration between server systems. Method 600 may be performed by system 100 of FIG. 1 or some other system configured to perform a migration between server systems. A scheduler computer system, such as scheduler computer system 300 of FIG. 3, which may be a separate computer system, the source server system, or the target server system, may perform the steps of method 600. Therefore, to perform the steps of method 600, one or more computer systems, such as computer system 700 of FIG. 7, may be used. Means for performing each step of method 600 may include one or more instances of the components discussed in relation to scheduler computer system 300 of FIG. 3 and/or computer system 700 of FIG. 7. Method 600 may represent a more detailed embodiment of method 500 of FIG. 5.

At step 605, indications of multiple migration scripts may be received. Each of these migration scripts may be intended for execution as part of a migration from a source computer system to a target computer system. The migration scripts may have been generated by a component other than the scheduler computer system. For example, U.S. patent application Ser. No. 13/937,988 filed Jul. 9, 2013 now U.S. Pat. No. 9,747,311, issued Aug. 29, 2017, by Buehne et al. and entitled "SOLUTION TO GENERATE A SCRIPTSET FOR AN AUTOMATED DATABASE MIGRATION," which was previously incorporated by reference, details how a migration script may be generated. The scheduler computer system may receive an indication of each migration script. For example, the scheduler computer system may be pointed to a file storage arrangement in which the migration scripts are stored. The migration scripts themselves may be provided to the scheduler computer system or, in some embodiments, a listing (e.g., table) of the migrations scripts may be provided to the scheduler computer system. An administrator, whether local or remote to the scheduler computer system, may cause the scheduler computer system to receive the indications of the multiple migration scripts which will be executed to cause the migration of the database system from the source computer system to the target server system.

At step 610, a storage size of some or all database objects to be copied from the source server system to the target server system may be determined. The storage size may be used to estimate the amount of time the transfer of each of these database objects will take. This information may be used in determining the execution order of the migration scripts. Determining the size of each migration script may be based on the scheduler computer system providing a script to the source server system which is executed and used to determine the file size of each database object that will be transferred. In some embodiments, one or more index database objects stored by the source server system may be analyzed. The size and/or other characteristics of the indexes stored by the source server system may be used to estimate an amount of time it will take for the target server system to generate corresponding indexes.

At step 615, the scheduler computer system may determine an execution order in which the migration scripts as indicated at step 605 will be initialized for execution. The actual execution of the migration scripts may be performed by the source server system and/or the target server system. The execution order determined by the scheduler computer system may be based on various factors. A first factor may be dependencies of migration scripts. For a particular database to be migrated, at least three migration scripts may be present, which may need to be performed in order. For example, a migration copy script may need to be performed before a migration index generation script and/or a migration verification script is performed for a same database.

At step 620, execution of one or more of the migration scripts may be initialized. This may involve one or more migration scripts being executed by the target server system and/or the source server system in parallel. The initialization of migrations scripts may be at least partially based on the execution order determined at step 615. Attributes defined by an administrator, who may be local or remote to the scheduler computer system, may also affect which migration scripts and how many migration scripts are initialized. Initially, at least some of the migration scripts may be directed to copying (or otherwise transferring) database objects from the source server system to the target server system.

At step 625, the transfer of a database object that is being copied from the source server system to the target server system may be configured such that the structure of the copied database object to the target server system differs from the structure of the corresponding database object at the source server system. In some embodiments, the structural difference may be compression on table or index objects (to reduce storage size). In some embodiments, the structural difference may involve elements within the database object being organized differently. For instance, it is possible to update the data types "LONG" or "LONG RAW" to the preferred data types "CLOB" or "BLOB." These data types use a new data type "Secure File," which can itself use two different approaches: "Basic Type" and "Secure File." Based on parameter settings, the tables using the former data type "LONG" or "LONG RAW" are created at the target server system with the data types "CLOB" or "BLOB," respectively. Further, the contents of a BLOB or CLOB field can be compressed. A table not partitioned on the source server system, can be partitioned when it is created on the target server system. The partitioning can be customized either by customer or can use a form of automatic partitioning, such as Oracle's® Automated Partitioning. As part of a table partitioning, the indexes for this table can also be partitioned. Therefore, a former non-partitioned index can be locally partitioned.

The changes to be implemented to database objects during the transfer process may be configured by the administrator via the scheduler computer system or may be indicated within the migration script that causes the database object to be transferred to the target server system from the source server system. Such changes to the structure of a database object may be performed to one or more database objects as part of the transfer to the target server system from the source server system.

At step 630, an administrator may be permitted to define a maximum number of migration scripts permitted to be executed in parallel. As such, the administrator may increase or decrease the maximum number while the migration is being performed. As such, if the administrator decreases the number of migration scripts permitted to be executed in parallel by the source server system and/or the target server system, execution of one or more migration scripts may be paused and resumed at a later time or aborted and restarted at a later time at step 635. If the administrator increases the number of migration scripts permitted to be executed in parallel by the source server system and/or the target server system, scheduler computer system may initiate execution of one or more additional migration scripts by the source server system and/or the target server system at step 635. Input from the administrator defining a maximum number of migration scripts which can be performed by the source server system and/or the target server system in parallel may also be received before migration scripts have begun being initialized. For instance, the administrator may start the migration by permitting each of the source server system and the target server system to perform a small number of migration scripts in parallel (e.g., three by the source server system, five by the target server system) and may ramp up the number permitted by one or both of the systems as the administrator monitors the systems.

It may also be possible to reduce the number of parallel executed scripts, either by limiting the maximum number of scripts allowed to be executed or by limiting the number of scripts for a particular job type. Limits can apply to the source server system and/or the target server system. If the number of scripts permitted to be run in parallel is reduced, the scheduler engine will not start a new script until the number scripts being executed in parallel is below the new threshold.

At step 640, the amount of available resources available at the source server system and/or the target server system may be monitored. The resources monitored may include processing resources and/or communication bandwidth between the source server system and the target server system. If the source server system is online during the migration, the amount of available resources may be affected by incoming database requests. It many instances, the target server system will have more available processing resources than the source server system possibly due to the target server system being a more advanced system and/or the target server system not being online to fulfill database requests. For more detail on how monitoring the resources that are available at the source server system and/or the target server system may occur, U.S. patent application Ser. No. 13/937,344 filed Jul. 9, 2013, now U.S. Pat. No. 9,491,072, issued Nov. 8, 2016 by Raghunathan et al. and entitled "CLOUD SERVICES LOAD TESTING AND ANALYSIS" which was previously incorporated by reference details various load testing arrangements.

At step 645, the execution order for the multiple migration scripts may be modified based on the amount of available resources at the source server system and/or the target server system. Such modification may involve determining whether to take a migration script out of order (in a different order than is specified by the execution order). Such modification may alternatively involve modifying the execution order such that a table or other form of data storage arrangement which indicates the execution order is modified.

As an example of when the execution order may be modified, if the target server system has above a first threshold of processing resources available but below a second threshold of processing resources available, a migration script may be executed out of the order indicated by the execution order. The migration script executed out of order may only need more than the first threshold of processing resources available, while the migration script indicated by the execution order to be executed next may have required at least the second threshold of processing resources be available. The migration script executed out of order may have been the next migration script in the execution order that was estimated to only require an amount of processing resources that were available. The monitoring of processing resources at step 640 may be used in determining if a migration script should be executed out of order and which migration script should then be executed. The execution order may be progressively parsed until a migration script is identified on which is permitted to be executed (e.g., due to dependencies) and for which it is estimated there are sufficient processing resources available by the system that is to perform the migration script.

At step 650, a determination may be made if additional migration scripts are remaining that have not yet been executed. Such a determination may be based on whether any migration scripts that are present in the execution order have yet to be initiated. If all of the migration scripts have been initiated, execution may be permitted to complete and the migration may be identified as complete at step 655. If additional migration scripts are to be executed, method 600 may return to step 620 such that one or more additional migration scripts can be initiated based on the execution order or modified execution order. It should be understood that modifying the execution order may also be performed by examining the execution order determined at step 615 and initializing a migration script from the execution order out of order (as determined at step 645). Steps 620 through 650 may repeat until the migration is complete. During this time, an administrator may define or redefine attributes which indicate how the scheduler system manages the migration from the source server system to the target server system.

Figure 7:
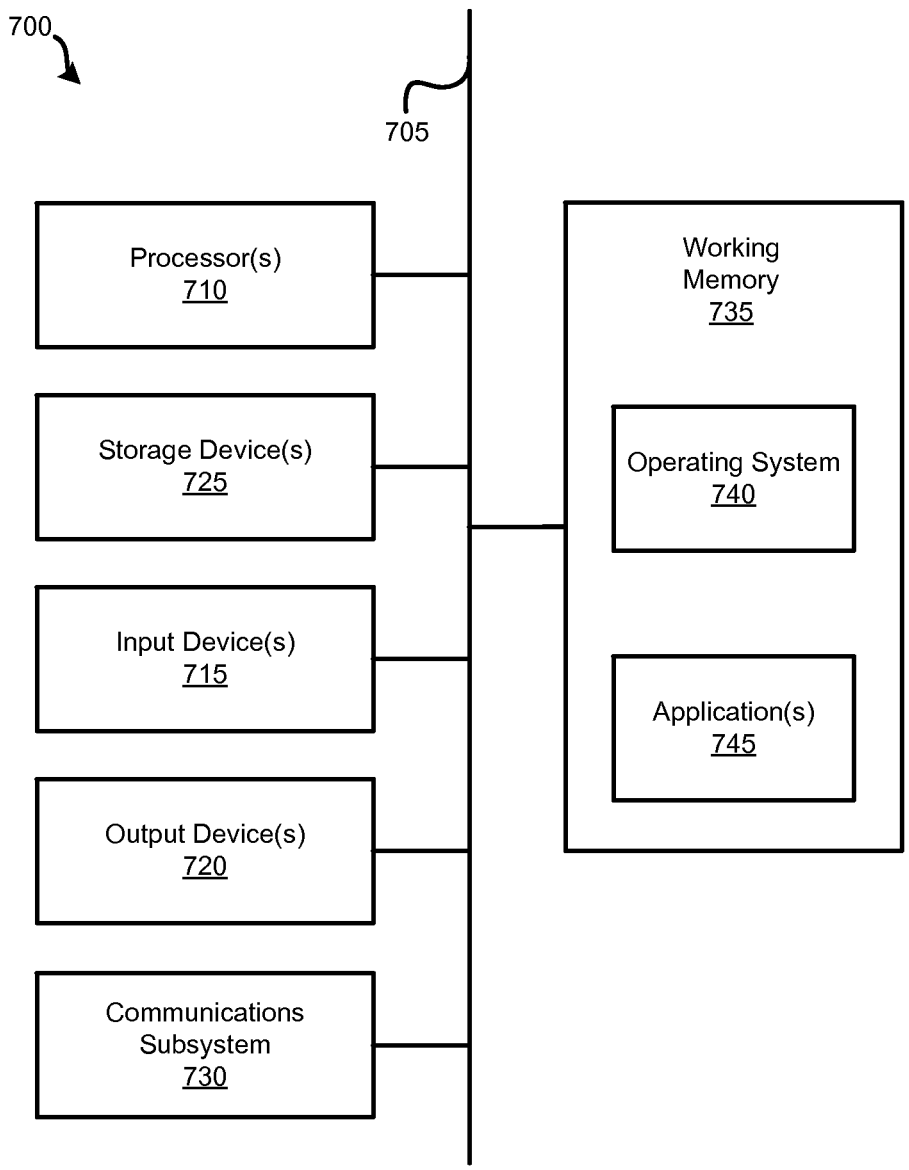
FIG. 7 illustrates an embodiment of a computer system.

FIG. 7 illustrates an embodiment of a computer system. A computer system as illustrated in FIG. 7 may be incorporated as part of the previously described computerized devices, such as the source server system, target server system, scheduler computer system, and remote administrator computer system. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication, as appropriate). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a keyboard, remote control, and/or the like; and one or more output devices 720, which can include without limitation a display device, a printer, and/or the like.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, an 802.11 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A method for managing migration between server systems, the method comprising:
receiving, by a scheduler computer system, indications of a plurality of migration scripts to be executed during a migration of a database system from a source server system to a target server system, wherein the source server system is online and processing database requests during the migration of the database system;
determining, by the scheduler computer system, an execution order for the plurality of migration scripts based upon characteristics of a plurality of database objects to be migrated using the plurality of migration scripts and characteristics of the plurality of migration scripts;

initiating, by the scheduler computer system, execution of a first migration script of the plurality of migration scripts according to the determined execution order, wherein the first migration script causes copying of a first database object of the plurality of database objects from the source server system to the target server system;

determining, by the scheduler computer system, an amount of available resources at the source server system based on the database requests processed while the source server system is online;

modifying, by the scheduler computer system, the execution order for the plurality of migration scripts based on the amount of available resources at the source server system, wherein the amount of available resources at the source server system is based on the database requests processed while the source server system is online; and initiating, by the scheduler computer system, execution of a second migration script of the plurality of migration scripts according to the modified execution order, wherein the second migration script causes copying of a second database object of the plurality of database objects from the source server system to the target server system.

2. The method for managing migration between server systems of claim 1, the method further comprising:

while the first migration script is being executed, receiving, by the scheduler computer system, an indication of a maximum number of migration scripts permitted to be executed in parallel; and based on the determined execution order and the maximum number of migration scripts permitted to be executed in parallel, initiating, by the scheduler computer system, execution of a second migration script of the plurality of migration scripts while the first migration script is executing.

3. The method for managing migration between server systems of claim 1, the method further comprising:

while a subset of the migration scripts of the plurality of migration scripts are being executed and after the first migration script has completed, determining, by the scheduler computer system, an amount of available resources of the target server system exceeds a first threshold amount; and in response to determining the amount of available resources of the target server system exceeds the first threshold amount, initiating, by the scheduler computer system, an index creation for the first database object copied to the target server system based on the first migration script, wherein the index creation is performed by the target server system.

4. The method for managing migration between server systems of claim 1, wherein determining the execution order for the plurality of migrations scripts is based on execution dependencies of migration scripts of the plurality of migrations scripts on one or more other migration scripts of the plurality of migrations scripts.

5. The method for managing migration between server systems of claim 1, the method further comprising:

while a subset of the migration scripts of the plurality of migration scripts are being executed and after the first migration script has completed, determining, by the scheduler computer system, an amount of available resources of the target server system exceeds a first threshold amount; and based upon the determined execution order, execution of the first migration script being complete, and the amount of available resources of the target server system exceeding the first threshold amount, initiating, by the scheduler computer system, execution of a verification script that causes the target server system to count a number of records in the first database object copied to the target server system.

6. The method for managing migration between server systems of claim 1, wherein initiating the execution of the first migration script of the plurality of migration scripts according to the determined execution order comprises:

causing, by the scheduler computer system, modification of a structure of the first database object being copied to the target server system as compared to the structure of the first database object as stored by the source server system.

7. The method for managing migration between server systems of claim 6, wherein the modification of the structure comprises compression of the first database object such that the first database object stored by the source server system is not compressed and the first database object stored by the target server system is compressed.

8. The method for managing migration between server systems of claim 1, wherein determining the execution order for the plurality of migration scripts based upon characteristics of the plurality of database objects to be migrated comprises:

evaluating, by the scheduler computer system, storage sizes of individual database objects of the plurality of database objects; and based on the evaluated storage sizes of the plurality of database objects, prioritizing, by the scheduler computer system, in the determined execution order the first migration script for the first database object due to the first database object having a larger storage size than one or more other database objects of the plurality of database objects.

9. The method for managing migration between server systems of claim 1, the method further comprising:

while a subset of the migration scripts of the plurality of migration scripts are being executed and after the first migration script has completed, determining, by the scheduler computer system, an amount of available resources of the target server system exceeds a first threshold amount but does not exceed a second threshold amount, wherein the second threshold amount is greater than the first threshold amount; and in response to determining the amount of available resources of the target server system exceeds the first threshold amount but not the second threshold amount, initiating, by the scheduler computer system, index creation for the first database object copied to the target server system based on the first migration script instead of index creation for a second database object copied to the target server system based on a second migration script, wherein index generation for the second database object is more resource intensive than index generation for the first database object;

the determined execution order indicates index generation for the second database object is to be performed before index generation for the first database object; and the index creation is performed by the target server system.

10. The method for managing migration between server systems of claim 1, wherein the scheduler computer system is selected from the group consisting of:
 the target server system; and
 the source server system.

11. A system for managing migration between server systems, the system comprising:
 a source server system;
 a target server system; and
 a scheduler computer system, comprising:
  one or more processors; and
  a memory communicatively coupled with and readable by the one or more processors and having stored therein processor-readable instructions which, when executed by the one or more processors, cause the one or more processors to:
   receive indications of a plurality of migration scripts to be executed during a migration of a database system from the source server system to the target server system, wherein the source server system is online and processing database requests during the migration of the database system;
   determine an execution order for the plurality of migration scripts based upon characteristics of a plurality of database objects to be migrated using the plurality of migration scripts and characteristics of the plurality of migration scripts;
   initiate execution of a first migration script of the plurality of migration scripts according to the determined execution order, wherein the first migration script causes copying of a first database object of the plurality of database objects from the source server system to the target server system;
   determine an amount of available resources at the source server system based on the database requests processed while the source server system is online;
   modify the execution order for the plurality of migration scripts based on the amount of available resources at the source server system, wherein the amount of available resources at the source server system is based on the database requests processed while the source server system is online; and
   initiate execution of a second migration script of the plurality of migration scripts according to the modified execution order, wherein the second migration script causes copying of a second database object of the plurality of database objects from the source server system to the target server system.

12. The system for managing migration between server systems of claim 11, wherein the processor-readable instructions, when executed, further cause the one or more processors of the scheduler computer system to:
 while the first migration script is being executed, receive an indication of a maximum number of migration scripts permitted to be executed in parallel; and
 based on the determined execution order and the maximum number of migration scripts permitted to be executed in parallel, initiate execution of a second migration script of the plurality of migration scripts while the first migration script is executing.

13. The system for managing migration between server systems of claim 11, wherein the processor-readable instructions, when executed, further cause the one or more processors of the scheduler computer system to:
 while a subset of the migration scripts of the plurality of migration scripts are being executed and after the first migration script has completed, determine an amount of available resources of the target server system exceeds a first threshold amount; and
 in response to determining the amount of available resources of the target server system exceeds the first threshold amount, initiate an index creation for the first database object copied to the target server system based on the first migration script, wherein
  the index creation is performed by the target server system.

14. The system for managing migration between server systems of claim 11, wherein the processor-readable instructions for determining the execution order for the plurality of migrations scripts are based on execution dependencies of migration scripts of the plurality of migrations scripts on one or more other migration scripts of the plurality of migrations scripts.

15. The system for managing migration between server systems of claim 11, wherein the processor-readable instructions, when executed, further cause the one or more processors of the scheduler computer system to:
 while a subset of the migration scripts of the plurality of migration scripts are being executed and after the first migration script has completed, determine an amount of available resources of the target server system exceeds a first threshold amount; and
 based upon the determined execution order, execution of the first migration script being complete, and the amount of available resources of the target server system exceeding the first threshold amount, initiate execution of a verification script that causes the target server system to count a number of records in the first database object copied to the target server system.

16. The system for managing migration between server systems of claim 11, wherein the processor-readable instructions for initiating the execution of the first migration script of the plurality of migration scripts according to the determined execution order comprises processor-readable instructions, when executed, cause the one or more processors of the scheduler computer system to:
 cause modification of a structure of the first database object being copied to the target server system as compared to the structure of the first database object as stored by the source server system.

17. The system for managing migration between server systems of claim 11, wherein the processor-readable instructions for determining the execution order for the plurality of migration scripts based upon characteristics of the plurality of database objects to be migrated comprises processor-readable instructions, when executed, cause the one or more processors of the scheduler computer system to:
 evaluate storage sizes of individual database objects of the plurality of database objects; and
 based on the evaluated storage sizes of the plurality of database objects, prioritize in the determined execution order the first migration script for the first database object due to the first database object having a larger storage size than one or more other database objects of the plurality of database objects.

18. The system for managing migration between server systems of claim 11, wherein the processor-readable instructions, when executed, further cause the one or more processors of the scheduler computer system to:
 while a subset of the migration scripts of the plurality of migration scripts are being executed and after the first migration script has completed, determine an amount of available resources of the target server system exceeds a first threshold amount but does not exceed a second threshold amount, wherein the second threshold amount is greater than the first threshold amount; and in response to determining the amount of available resources of the target server system exceeds the first threshold amount but not the second threshold amount, initiate index creation for the first database object copied to the target server system based on the first migration script instead of index creation for a second database object copied to the target server system based on a second migration script, wherein index generation for the second database object is more resource intensive than index generation for the first database object;

the determined execution order indicates index generation for the second database object is to be performed before index generation for the first database object; and the index creation is performed by the target server system.

19. The system for managing migration between server systems of claim 11, wherein the scheduler computer system is selected from the group consisting of:

the target server system; and the source server system.

20. A non-transitory processor-readable medium for managing migration between server systems, comprising processor-readable instructions configured to cause one or more processors to:

receive indications of a plurality of migration scripts to be executed during a migration of a database system from a source server system to a target server system, wherein the source server system is online and processing database requests during the migration of the database system;

determine an execution order for the plurality of migration scripts based upon characteristics of a plurality of database objects to be migrated using the plurality of migration scripts and characteristics of the plurality of migration scripts;

initiate execution of a first migration script of the plurality of migration scripts according to the determined execution order, wherein the first migration script causes copying of a first database object of the plurality of database objects from the source server system to the target server system;

determine an amount of available resources at the source server system based on the database requests processed while the source server system is online;

modify the execution order for the plurality of migration scripts based on the amount of available resources at the source server system, wherein the amount of available resources at the source server system is based on the database requests processed while the source server system is online; and initiate execution of a second migration script of the plurality of migration scripts according to the modified execution order, wherein the second migration script causes copying of a second database object of the plurality of database objects from the source server system to the target server system.

* * * * *

UNITED STATES PATENT AND TRADEMARK OFFICE
CERTIFICATE OF CORRECTION

PATENT NO. : 9,805,070 B2
APPLICATION NO. : 13/937486
DATED : October 31, 2017
INVENTOR(S) : Buehne et al.

Page 1 of 1

It is certified that error appears in the above-identified patent and that said Letters Patent is hereby corrected as shown below:

In the Specification

In Column 1, Line 24, delete "13/937,341" and insert -- 13/937,344 --, therefor.

Signed and Sealed this
Twenty-sixth Day of June, 2018

Andrei Iancu
*Director of the United States Patent and Trademark Office*